United States Patent
Kamiya

(10) Patent No.: US 11,958,732 B2
(45) Date of Patent: Apr. 16, 2024

(54) INDUSTRIAL VEHICLE REMOTE OPERATION SYSTEM, REMOTE OPERATION DEVICE, INDUSTRIAL VEHICLE, REMOTE MEMORY STORING INDUSTRIAL VEHICLE REMOTE OPERATION PROGRAM, AND INDUSTRIAL VEHICLE REMOTE OPERATION METHOD

(71) Applicant: KABUSHIKI KAISHA TOYOTA JIDOSHOKKI, Kariya (JP)

(72) Inventor: Tomonori Kamiya, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 860 days.

(21) Appl. No.: 16/982,303

(22) PCT Filed: Mar. 6, 2019

(86) PCT No.: PCT/JP2019/008838
§ 371 (c)(1),
(2) Date: Sep. 18, 2020

(87) PCT Pub. No.: WO2019/181504
PCT Pub. Date: Sep. 26, 2019

(65) Prior Publication Data
US 2023/0322538 A1    Oct. 12, 2023

(30) Foreign Application Priority Data
Mar. 23, 2018   (JP) .................................. 2018-056879

(51) Int. Cl.
*B66F 9/075* (2006.01)
*G05D 1/00* (2006.01)
*G06F 3/04817* (2022.01)
*G06F 3/0488* (2022.01)

(52) U.S. Cl.
CPC ....... *B66F 9/07581* (2013.01); *G05D 1/0016* (2013.01); *G05D 1/0061* (2013.01);
(Continued)

(58) Field of Classification Search
None
See application file for complete search history.

(56) References Cited

U.S. PATENT DOCUMENTS

2008/0071429 A1    3/2008   Kraimer et al.
2016/0264387 A1*   9/2016   Yoon ...................... B66C 13/46
(Continued)

FOREIGN PATENT DOCUMENTS

DE    20 2017 104 769 U1    11/2017
EP       3 175 693 A1        6/2017
(Continued)

OTHER PUBLICATIONS

Teller et al, "A Voice-Commandable Robotic Forklift Working Alongside Humans in Minimally-Prepared Outdoor Environments", 2010 IEEE International Conference on Robotics and Automation, pp. 526-533 (Year: 2010).*
(Continued)

*Primary Examiner* — Tamara L Weber
(74) *Attorney, Agent, or Firm* — Sughrue Mion, PLLC

(57) ABSTRACT

An industrial vehicle remote operation system includes an industrial vehicle including a vehicle communication part that performs wireless communication; a remote operation device including a remote communication part that performs wireless communication with the vehicle communication part, wherein the remote operation device is used to remotely operate the industrial vehicle; and a remote-operation stop control part that, based on a fact that a remote-operation stop operation has been performed on the remote operation device in a situation where operation of the
(Continued)

industrial vehicle is being performed through a remote operation by the remote operation device, performs an operation stop control for stopping the operation of the industrial vehicle, and stops the remote operation by the remote operation device after the operation stop control is completed.

13 Claims, 14 Drawing Sheets

(52) U.S. Cl.
CPC ........ *G06F 3/04817* (2013.01); *G06F 3/0488* (2013.01); *G05D 2201/0216* (2013.01)

(56) References Cited

U.S. PATENT DOCUMENTS

| | | |
|---|---|---|
| 2016/0340867 A1 | 11/2016 | Matsuzaki |
| 2017/0153637 A1 | 6/2017 | Wetegrove et al. |
| 2017/0248946 A1 | 8/2017 | Ogura et al. |
| 2019/0031475 A1 | 1/2019 | Hayashi et al. |
| 2020/0211365 A1 | 7/2020 | Haug |

FOREIGN PATENT DOCUMENTS

| | | |
|---|---|---|
| GB | 2 460 326 A | 12/2009 |
| JP | 2002-104800 A | 4/2002 |
| JP | 2016-168883 A | 9/2016 |
| WO | 2017/135382 A1 | 8/2017 |

OTHER PUBLICATIONS

Communication dated Mar. 30, 2021, from the European Patent Office in European Application No. 19772132.7.

\* cited by examiner

FIG. 3

| TRAVELING OPERATION INFO D1 | | | CARGO HANDLING OPERATION INFO D2 | | |
|---|---|---|---|---|---|
| TRAV SPEED INFO Dv | ACC INFO Da | STEERING ANGLE INFO Dθ | LIFT INFO Dfa | REACH INFO Dfb | TILT INFO Dfc |

FIG. 4

| CONTROL MODE | REMOTE OPE | MANNED OPE |
|---|---|---|
| REMOTE MODE | YES | NO |
| MANNED MODE | NO | YES |
| NEUTRAL MODE | NO | NO |

INDUSTRIAL VEHICLE REMOTE OPERATION SYSTEM, REMOTE OPERATION DEVICE, INDUSTRIAL VEHICLE, REMOTE MEMORY STORING INDUSTRIAL VEHICLE REMOTE OPERATION PROGRAM, AND INDUSTRIAL VEHICLE REMOTE OPERATION METHOD

CROSS-REFERENCE TO RELATED APPLICATION

This application is a National Stage of International Application No. PCT/JP2019/008838 filed on Mar. 6, 2019, claiming priority based on Japanese Patent Application No. 2018-056879 filed on Mar. 23, 2018, the contents of all of which are incorporated herein by reference in their entirety.

TECHNICAL FIELD

The present invention relates to an industrial vehicle remote operation system, a remote operation device, an industrial vehicle, a remote memory storing an industrial vehicle remote operation program, and an industrial vehicle remote operation method.

BACKGROUND ART

Patent Literature 1 describes that a remote control device serving as a remote operation device that remotely operates a forklift truck serving as an industrial vehicle remotely operates the cargo handling work of the forklift truck from a remote position distant from the forklift truck.

CITATIONS LIST

Patent Literature

Patent Literature 1: Japanese Patent Application Publication No. 2002-104800

SUMMARY OF INVENTION

Technical Problems

Here, in the configuration in which the industrial vehicle is remotely operated using the remote operation device, for example, the operator may want to slop the remote operation and perform another work. In this case, for example, if the operation of the industrial vehicle continue even after the remote operation is stopped during the operation of the industrial vehicle, deterioration of safety becomes a concern.

On the other hand, for example, the operator may perform another work after performing the remote operation to stop the operation of the industrial vehicle. However, in this case, there is a concern that the operator may forget the remote operation to stop the operation of the industrial vehicle.

The present invention has been made in view of the above circumstances, and an object thereof is to provide an industrial vehicle remote operation system, a remote operation device, an industrial vehicle, a remote memory storing an industrial vehicle remote operation program, and an industrial vehicle remote operation method capable of improving safety.

Solutions to Problems

An industrial vehicle remote operation system that achieves the above object includes, an industrial vehicle including a vehicle communication part that performs wireless communication; a remote operation device including a remote communication part that performs wireless communication with the vehicle communication part and being used to remotely operate the industrial vehicle; and a remote-operation stop control part that, based on a fact that a remote-operation stop operation has been performed on the remote operation device in a situation where operation of the industrial vehicle is performed through a remote operation by the remote operation device, performs an operation stop control for stopping the operation of the industrial vehicle, and slops the remote operation by the remote operation device after the operation stop control is completed.

According to such a configuration, the operation stop control is performed by performing the remote-operation stop operation in a situation where the industrial vehicle is operated through the remote operation by the remote operation device, and the remote operation by the remote operation device is stopped after the operation stop control is completed. Thus, when stopping the remote operation during the operation of the industrial vehicle, the remote-operation stop operation is performed without performing the remote operation for stopping the operation of the industrial vehicle. Therefore, even if the remote operation for stopping the operation of the industrial vehicle is forgotten, a disadvantage in that the operation of the industrial vehicle is continuously performed after the remote operation is stopped may be suppressed, and the safety may be enhanced. Furthermore, since the operator does not need to perform the remote operation for stopping the operation of the industrial vehicle, the operation required for stopping the remote operation may be simplified, and the operator may shift to another work at an early stage.

In the industrial vehicle remote operation system, the industrial vehicle may include a vehicle operation part for performing the operation of the industrial vehicle; a control mode of the industrial vehicle may include a remote mode in which the operation of the industrial vehicle is performed not through operation of the vehicle operation part but through the remote operation by the remote operation device, a manned mode in which the operation of the industrial vehicle is performed not through the remote operation by the remote operation device but though the operation of the vehicle operation part, and a neutral mode n which neither the operation of the industrial vehicle through the remote operation by the remote operation device nor the operation of the industrial vehicle through the operation of the vehicle operation part is performed; and the remote-operation stop control part may perform, based on the fact that the remote-operation stop operation has been performed on the remote operation device in a situation where the control mode is the remote mode and the operation of the industrial vehicle is performed, the operation stop control, and shift the control mode from the remote mode to the neutral mode after the operation stop control is completed.

According to this configuration, the operation of the industrial vehicle based on the operation by the vehicle operation part is not performed in the remote mode. Thus, the behavior of the industrial vehicle may be suppressed from becoming unstable due to the remote operation by the remote operation device and the operation by the vehicle operation part being performed simultaneously.

Similarly, in the manned mode, the remote operation by the remote operation device is not performed, and thus, for example, the behavior of the industrial vehicle may be suppressed from becoming unstable due to the remote operation by the remote operation device being performed during the operation of the industrial vehicle performed through the operation by the vehicle operation part.

Furthermore, according to the configuration, after the operation stop control is completed, the control mode shifts from the remote mode to the neutral mode. The remote operation by the remote operation device is thereby stopped. In this case, since the control mode after the operation stop control is completed becomes the neutral mode in which the operation of the industrial vehicle is not performed, the erroneous operation of the industrial vehicle that may occur when the control mode is switched may be suppressed, and the safety may be further enhanced.

In the industrial vehicle remote operation system, the industrial vehicle may include a man sensor that detects an occupant in the industrial vehicle; and the industrial vehicle remote operation system may include a manned mode shift part that, when the control mode is the neutral mode, shifts the control mode from the neutral mode to the manned mode based on satisfaction of a manned mode shift condition including that an occupant has been detected by the man sensor.

According to this configuration, when the manned mode shift condition including a condition that the occupant has been detected is satisfied, the control mode shifts from the neutral mode to the manned mode. Thus, the operation of the industrial vehicle is performed based on the operation by the vehicle operation part by the occupant. Therefore, the operation of the industrial vehicle based on the operation by the vehicle operation part in a state where the occupant is not riding may be restricted, so that the safety may be further enhanced.

The industrial vehicle remote operation system may further include a neutral mode shift part that, when the control mode is the manned mode, shifts the control mode from the manned mode to the neutral mode based on satisfaction of a neutral mode shift condition including that an occupant has not been detected by the man sensor.

According to this configuration, in the manned mode, when the neutral shift condition including a condition that the occupant is absent is satisfied, the control mode shifts from the manned mode to the neutral mode. Thus, the manned mode may be suppressed from being continued in a state where the occupant is absent.

The industrial vehicle remote operation system may further include a remote mode shift part that, when the control mode is the neutral mode, shifts the control mode from the neutral mode to the remote mode based on a fact that a remote-operation start operation has been performed on the remote operation device.

According to this configuration, in order to shift the control mode to the remote mode, the remote-operation start operation needs to be performed in the neutral mode. Thus, the shift to the remote mode, which is against the operators intention, may be suppressed, and the remote operation by the remote operation device may be suppressed from being accidentally performed.

In the industrial vehicle remote operation system, the industrial vehicle may include a vehicle operation part for performing the operation of the industrial vehicle; the control mode of the industrial vehicle may include, a remote mode in which the operation of the industrial vehicle is performed not through operation of the vehicle operation part but through the remote operation by the remote operation device, and a manned mode in which the operation of the industrial vehicle is performed not through the remote operation by the remote operation device but through the operation of the vehicle operation part; and the remote-operation stop control part may perform, based on a fact that the remote operation stop operation has been performed on the remote operation device in a situation where the control node is the remote mode and the operation of the industrial vehicle is performed, the operation stop control, and shifts the control mode from the remote mode to the manned mode after the operation stop control is completed.

According to this configuration, the operation of the industrial vehicle based on the operation by the vehicle operation part is not performed in the remote mode. Thus, the behavior of the industrial vehicle may be suppressed from becoming unstable due to the remote operation by the remote operation device and the operation by the vehicle operation part being performed simultaneously.

Similarly, in the manned mode, the remote operation by the remote operation device is not performed, and thus, for example, the behavior of the industrial vehicle may be suppressed from becoming unstable due to the remote operation by the remote operation device being performed during the operation of the industrial vehicle through the operation by the vehicle operation part.

Furthermore, according to this configuration, the control mode shifts from the remote mode to the manned mode after the operation stop control is completed. As a result, the remote operation by the remote operation device is stopped, and the industrial vehicle may be operated through the operation by the vehicle operation part. Thus, the switch tom the remote operation by the remote operation device to the direct operation of the industrial vehicle through the operation by the vehicle operation part may be smoothly performed.

In the industrial vehicle remote operation system, the industrial vehicle may include man sensor that detects an occupant in the industrial vehicle; the industrial vehicle remote operation system may further include a remote mode shift part that, when the control mode is the manned mode, shifts the control mode from the manned mode to the remote mode based on satisfaction of the remote mode shift condition; and the remote mode shift condition may include that an occupant has not been detected by the man sensor and the remote-operation start operation has been performed on the remote operation device.

With such a configuration, it is possible to prevent the remote operation by the remote operation device in a state where an occupant is riding the industrial vehicle and an operation of the industrial vehicle not intended by the occupant from being performed. Furthermore, even if the occupant is absent, if the remote-operation start operation is not performed, the mode does not shift to the remote mode, and thus unintended remote operation may be suppressed from being performed.

In the industrial vehicle remote operation system, the remote operation device includes a display screen, and a display control part that displays an operation image on the display screen when the control mode is the remote mode, and displays a standby image different from the operation image on the display screen when the control mode is rot the remote mode.

With this configuration, the operator may easily check whether not the current control mode is the remote mode by looking at the displayed image. This may suppress the false recognition of the control mode.

In the industrial vehicle remote operation system, the display screen may be a touch screen; and the remote operation stop operation may be an input operation to a remote-operation stop icon displayed in the operation image.

According to this configuration, the operation stop control is performed and the remote operation by the remote operation device is stopped by the operator performing the input operation to the remote-operation stop icon. Thus, the remote operation by the remote operation device may be stopped by a relatively simple operation.

In the industrial vehicle remote operation system, the remote mode may be a control mode in which the industrial vehicle performs the operation based on a remote control operation which is a kind of operation on the remote operation device; the remote control operation may include an input operation on an operation area displayed in the operation image; and the remote-operation stop icon and the operation area may be arranged spaced apart from each other and disposed respectively on opposite sides of the operation image.

With this configuration, the input operation on the operation area and the input operation to the remote-operation stop icon are less likely to interfere with each other. The erroneous operation thus may be suppressed. Furthermore, since the operation area and the remote-operation stop icon are arranged on opposite sides of the operation image, when the remote operation device is gripped with both hands, the input operation on the operation area may be performed with one hand, and the input operation to the remote-operation stop icon may be performed with the other hand. The remote-operation stop operation thus may be easily performed even during the remote control operation.

The industrial vehicle remote operation system may further include a normal remote control part that, based on a fact that the remote control operation, which is a kind of operation on the remote operation device, has been performed on the remote operation device in a situation where the control mode is the remote mode, performs a control such that the operation of the industrial vehicle corresponding to the remote control operation is performed; and the industrial vehicle remote operation system may be configured to preferentially perform the control by the remote operation stop control part over the control by the normal remote control part when the remote-operation stop operation and the remote control operation have been simultaneously performed on the remote operation device.

According to this configuration, when the remote-operation stop operation and the remote control operation have been simultaneously performed on the remote operation device, the operation stop control and the stopping of the remote operation are preferentially performed. Thus, the operation corresponding to the remote control operation may be suppressed from being continuously performed even if the remote-operation stop operation has been performed. Furthermore, according to the present configuration, since it is not necessary to perform the remote-operation stop operation alter the remote control operation is stopped, the operation for stopping the remote operation may be simplified.

In the industrial vehicle remote operation system, the industrial vehicle may include a remote drive control pert that, when a remote operation signal is received by the vehicle communication part, drives the industrial vehicle based on the remote operation signal; the remote operation device may remotely operate the industrial vehicle by transmitting the remote operation signal to the vehicle communication part using the remote communication part; the remote operation device may include a normal transmission control part that transmits a normal remote operation signal corresponding to the remote control operation on the remote operation device as the remote operation signal using the remote communication part and the remote-operation stop control part may be provided in the remote operation device, and as the operation stop control, transmit a stop remote operation signal for stopping the operation of the industrial vehicle as the remote operation signal using the remote communication part until the operation of the industrial vehicle is stopped regardless of whether or not the operation on the remote operation device is performed and prohibit the transmission of the normal remote operation signal by the normal transmission control part.

According to such a configuration, the industrial vehicle does not need to grasp whether or not the remote-operation stop operation is performed, and may be driven based on the remote operation signal even at the time of the operation stop control. Thus, the complication of the process of the industrial vehicle accompanying the execution of the operation stop control may be suppressed.

A remote operation device that achieves the above object includes a remote communication part for performing wireless communication with a vehicle communication part provided in an industrial vehicle, the remote operation device being used to remotely operate the industrial vehicle, the remote operation device including a remote-operation stop control part that, based on the fact that a remote-operation stop operation has been performed on the remote operation device in a situation where operation of the industrial vehicle is performed through a remote operation by the remote operation device, performs an operation stop control for slopping the operation of the industrial vehicle, and stops the remote operation by the remote operation device after the operation stop control is completed.

An industrial vehicle that achieves the above object includes a vehicle communication part for performing wireless communication with a remote communication part provided in a remote operation device, the industrial vehicle being remotely operated by the remote operation device, the industrial vehicle including a remote-operation stop control part that, based on a fact that a remote-operation op operation has been performed on the remote operation device in a situation where operation of the indusial vehicle is performed through a remote operation by the remote operation device, performs an operation stop control for stopping the operation, and stops the remote operation by the remote operation device after the operation stop control is completed.

A remote memory storing an industrial vehicle remote operation program that achieves the above object is provided to remotely operate an industrial vehicle using a remote operation device including a remote communication part for performing wireless communication with a vehicle communication part provided in the industrial vehicle, the industrial vehicle remote operation program causing the remote operation device to function as a remote-operation stop control part that, based on a fact that a remote-operation stop operation has been performed on the remote operation device in a situation where operation of the industrial vehicle is performed through a remote operation by the remote operation device, performs an operation stop control for stopping the operation of the industrial vehicle, and stops the remote operation by the remote operation device after the operation stop control is completed.

An industrial vehicle remote operation method that achieves the above object is provided to remotely operate an industrial vehicle using a remote operation device including a remote communication part for performing wireless communication with a vehicle communication part provided in the industrial vehicle, the industrial vehicle remote operation method comprising an operation stop control step in which the remote operation device performs, based on a fact that a remote-operation stop operation has been performed on the remote operation device in a situation where operation of the industrial vehicle is performed through a remote operation by the remote operation device, an operation stop control for sopping the operation of the industrial vehicle; and a remote operation stop step in which the remote operation device stops the remote operation by the remote operation device after the operation stop control is completed.

According to such a configuration, the operation stop control is performed by performing the remote-operation stop operation in a situation where the industrial vehicle is operated through the remote operation by the remote operation device, and the remote operation by the remote operation device is stopped after the operation stop control is completed. Thus, when stopping the remote operation during the operation of the industrial vehicle, the remote-operation stop operation is performed without performing the remote operation for stopping the operation of the industrial vehicle. Therefore, even if the remote operation for stopping the operation of the industrial vehicle is forgotten, a disadvantage in that the operation of the industrial vehicle is continuously performed after the remote operation is stopped may be suppressed, and the safety may be enhanced. Furthermore, since the operator does not need to perform the remote operation for stopping the operation of the industrial vehicle, the operation required for stopping the remote operation may be simplified, and the operator may shift to another work at an early stage.

Advantageous Effects of Invention

According to the present invention, the safety may be enhanced.

BRIEF DESCRIPTION OF DRAWINGS

FIG. 3 is a conceptual diagram for explaining a remote operation signal.
FIG. 4 is a conceptual diagram showing a relationship of a control mode, and a remote operation and a manned operation.

DESCRIPTION OF EMBODIMENT

First Embodiment

Hereinafter, a first embodiment of an industrial vehicle remote operation system and the like will be described.

Figure 1:
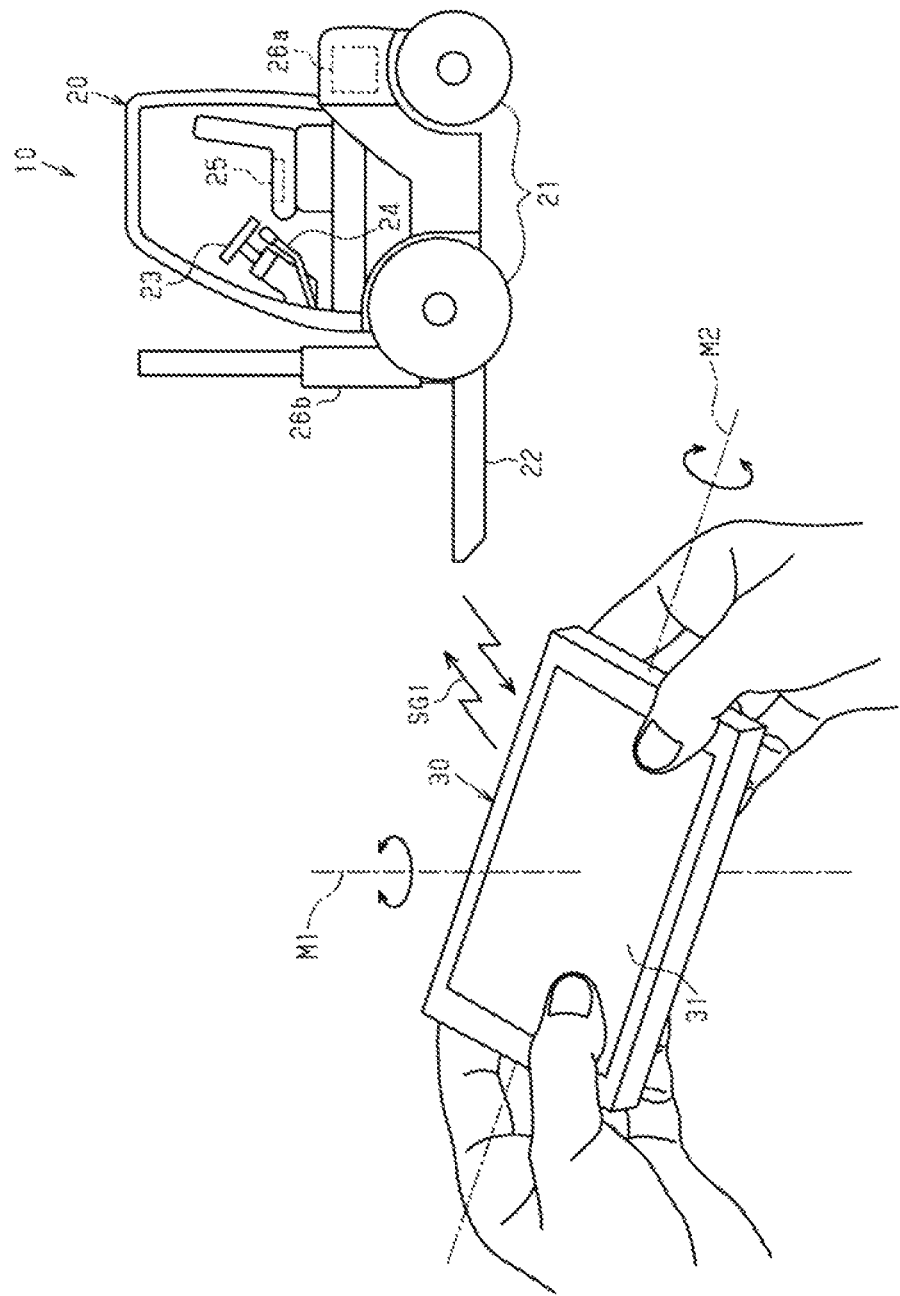
FIG. 1 is a schematic view of an industrial vehicle remote operation system.

As shown in FIG. 1, an industrial vehicle remote operation system 10 includes a forklift truck 20 serving as an industrial vehicle, and a remote operation device 30 used to remotely operate the forklift truck 20.

The forklift truck 20 includes wheels 21, a fork 22 as a cargo handling device for loading or unloading cargo handlings, a steering wheel 23, an operation lever 24 for operating the fork 22, and a man sensor 25.

The forklift truck 20 of the present embodiment is configured so as to be maneuvered by an occupant. That is, the forklift truck 20 is configured to be operated based on vehicle operation, which is a kind of operation on the forklift truck 20.

In the present embodiment, the vehicle operation includes operation of the steering wheel 23 and operation of the operation lever 24. The forklift truck 20 is configured to travel based on the operation of the steering wheel 23 and operate (drive) the fork 22 based on the operation of the operation lever 24. In the present embodiment, the steering wheel 23 and the operation lever 24 correspond to the "vehicle operation part", and the vehicle operation corresponds to the "operation of the vehicle operation part".

The forklift truck 20 may be, for example, an engine type mounted with an engine, an EV type mounted with a power storage device and an electric motor, or an FCV type mounted with a fuel cell and an electric motor Furthermore, the forklift truck may be, for example, an HV type including an engine, a power storage device, and an electric motor.

Moreover, in the present embodiment, the operation of the forklift truck 20 is to travel and to operate the fork 22. However, the operation of the forklift truck 20 is not limited to this, and may be at least one of the traveling and the operation of the fork 22 or may be something other than these. For example, when the forklift truck 20 has an actuator (drive part) other than the fork 22, it may be operated by the actuator. In other words, the remote operation target is not limited to traveling and fork 22.

The man sensor 25 detects an occupant in the forklift truck 20. The man sensor 25 is formed by, for example, a pressure sensor or the like provided on the seat of the forklift truck 20, and detects an occupant seated on the seat. The man sensor 25 allows the forklift truck 20 to grasp the presence or absence of an occupant.

The man sensor 25 may have any specific configuration as long as it may detect the occupant in the forklift truck 20, and for example, the man sensor 25 may be a pressure sensor or the like provided on the surface on which the occupant stands if it is a forklift truck (e.g., reach type forklift truck) of a type the occupant maneuvers in a standing state.

Figure 2:
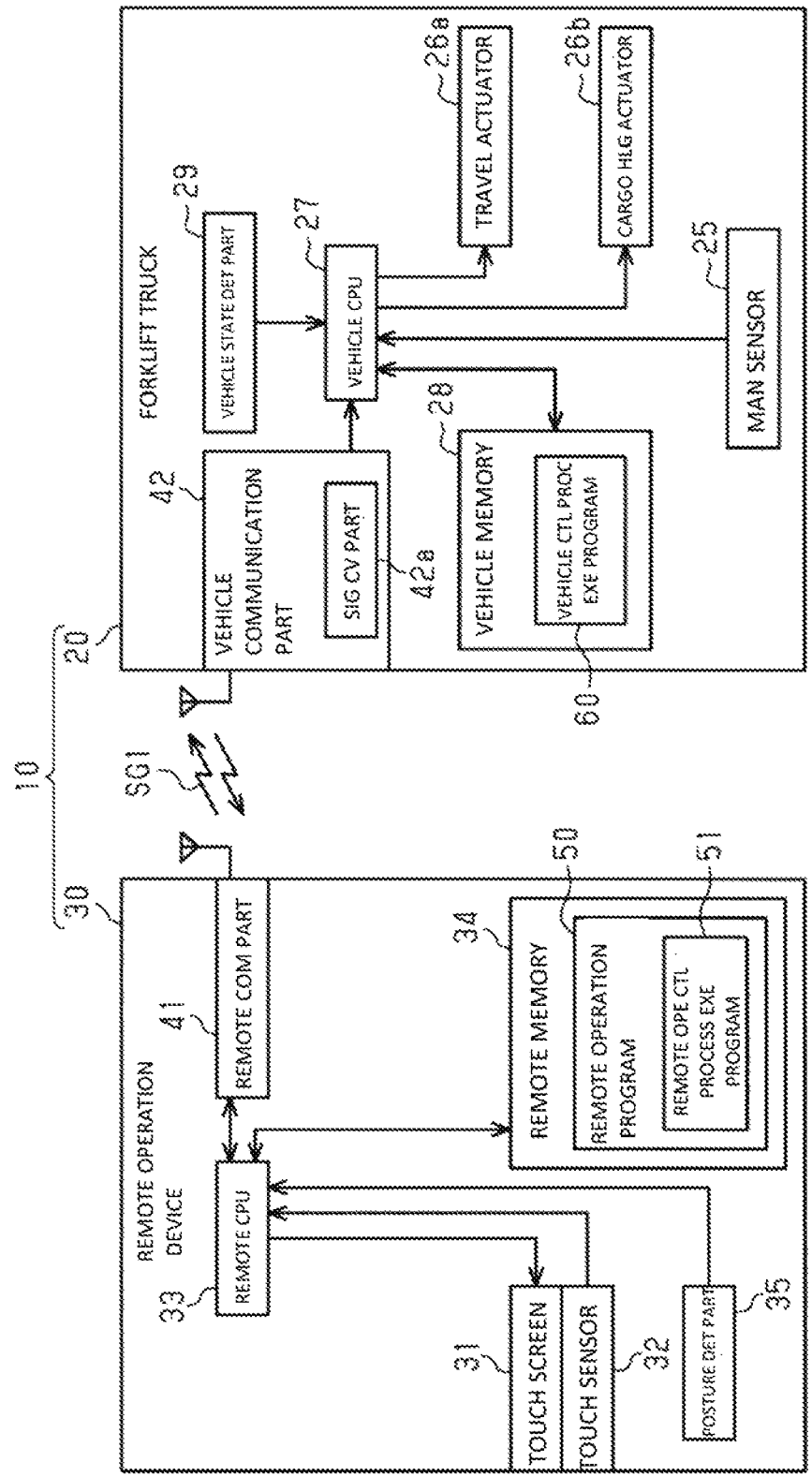
FIG. 2 is a block diagram showing an electrical configuration of the industrial vehicle remote operation system.

As shown in FIG. 2, the forklift truck 20 includes a travel actuator 26a, a cargo handling actuator 26b, a vehicle CPU 27 that controls both actuators 26a and 26b, a vehicle memory 28, and a vehicle state detection part 29.

The travel actuator 26a is used for traveling of the forklift truck 20, and specifically, rotably drives the wheels 21 and changes the steering angle (advancing direction). If the forklift truck 20 is an engine type, for example, the travel actuator 26a is a steering device or the like that changes the engine and the operating angle, and if the forklift truck 20 is an EV type, for example, the travel actuator 26a is an electric motor and a steering device or the like that rotatably drives the wheels 21.

The cargo handling actuator 26b is used for an operation different from traveling, and specifically, drives the fork 22. For example, the cargo handling actuator 26b performs a lift operation for moving the fork 22 in the up-down direction, a reach operation for moving the fork 22 in the front-back direction, and a tilt operation for tilting the fork 22.

The man sensor 25 outputs the detection result to the vehicle CPU 27. The vehicle CPU 27 determines that the occupant is detected when the man sensor 25 is in the ON state, and determines that the occupant is not detected when the man sensor 25 as in the OFF state. The vehicle CPU 27 thus may grasp the presence or absence of an occupant.

The vehicle CPU 27 controls the travel actuator 26a and the cargo handling actuator 26b based on the vehicle operation performed under the condition that the occupant has been detected by the man sensor 25. The forklift truck 20 thus may be manned operated. The vehicle CPU 27 may be referred to as a vehicle ECU or a vehicle MPU.

The vehicle state detection part 29 detects the state of the forklift truck 20. The vehicle state detection part 29 detects, for example, the current traveling mode of the forklift truck 20 and the operation mode of the fork 22 and also detects the presence or absence of abnormality of the forklift truck 20, and outputs a detection signal set with the detection results including the traveling information, operation information, and abnormality information, toward the vehicle CPU 27. The vehicle CPU 27 grasps the current state of the forklift truck 20 based on the detection signal input from the vehicle state detection part 29.

The traveling information includes, for example, information related to traveling speed, acceleration, and steering angle of the forklift truck 20. The operation information includes information related to the position (lift position) of the fork 22 in the up-down direction and the operation speed thereof if during the lift operation, information related to the position (reach position) of the fork 22 in the front-back direction and the operation speed thereof if during the reach operation, and information related to a tilt angle of the fork 22 in a vertical direction and the operation speed thereof if during the tilt operation.

Furthermore, the abnormality of the forklift truck 20 includes, for example, an abnormality of the travel actuator 26a or the cargo handling actuator 26b, an abnormality of the wheels 21, and the like. However, the abnormality of the forklift truck 20 is not limited to this, and is arbitrary, and for example, in the configuration in which the forklift truck 20 includes the power storage device, the abnormality of the power storage device and the like may be included.

The remote operation device 30 is an operation terminal having a communication function. The remote operation device 30 is a general-purpose product such as, for example, a smartphone or a tablet terminal. However, the present invention is not limited thereto, and the remote operation device 30 is arbitrary, and may be, for example, a controller used in a game device, a mobile phone, a virtual reality terminal, or the like, or may be a dedicated product for remote operation. As shown in FIG. 1, in the present embodiment, the remote operation device 30 has a rectangular plate shape in which one side is the longitudinal direction and the other side is the short direction.

As shown in FIG. 2, the remote operation device 30 includes a touch screen 31, a touch sensor 32, a remote CPU 33, a remote memory 34, and a posture detection part 35.

As shown in FIG. 1, the touch screen 31 is formed on one plate surface of the remote operation device 30. The touch screen 31 has a rectangular shape having a longitudinal direction and a short direction, where the longitudinal direction of the touch screen 31 matches the longitudinal direction of the remote operation device 30. The touch screen 31 is configured to display a desired image and forms a display screen.

When the remote operation device 30 is held sideways, the short direction of the touch screen 31 is the up-down direction or the front-back direction when viewed from the operator, and the longitudinal direction of the touch screen 31 is the left-right direction when viewed from the operator.

Note that, for the sake of convenience of explanation, in the lowing description, when the remote operation device 30 is held sideways so that the touch screen 31 may be visually recognized, the upper end of the touch screen 31 when viewed from the operator (upward direction in the plane of drawing in FIGS. 5 and 6) is the upper side and the lower end when viewed from the operator (downward direction in the plane of drawing in FIGS. 5 and 6) is the lower side.

The touch sensor 32 detects an input operation (e.g., a tap or a slide operation) on the touch screen 31, which is one kind of operation on the emote operation device 30. Specifically, the touch sensor 32 detects whether or not a finger is in contact with the touch screen 31, and when the contact of the finger is detected, detects the position thereof. Then, the touch sensor 32 outputs the detection result to the remote CPU 33. Thus, the remote CPU 33 may grasp the input operation on the touch screen 31. The specific configuration of the touch sensor 32 is arbitrary, and for example, includes a capacitance type sensor or a pressure sensor that makes the detection based on a change in capacitance.

The remote CPU 33 executes various processes using various programs stored in the remote memory 34. Specifically, the remote memory 34 stores a program relating to image control of the touch screen 31, and the remote CPU 33 performs a display control of the touch screen 31 by reading and executing the program. That is, in the present embodiment, the remote CPU 33 corresponds to the "display control part". Furthermore, the remote CPU 33 grasps various operations on the remote operation device 30 based on the signals input from the touch sensor 32 and the posture detection part 35.

The posture detection part 35 detects the posture of the remote operation device 30. The posture detection part 35 includes, for example, a triaxial acceleration sensor and a triaxial gyro sensor, and detects the posture of the remote operation device and its change based on information obtained from these sensors.

For example, as shown in FIG. 1, when both ends of the remote operation device 30 in the longitudinal direction are held by the operator, the posture detection part 35 detects the rotation operation (hereinafter simply referred to as "first rotation operation") having, as a first rotation axis, a fit center line M1 that passes through the center of the remote operation device 30 and extends in the thickness direction of the remote operation device 30. Furthermore, the posture detection part 35 detects the rotation operation (hereinafter simply referred to as "second rotation operation") having, as a second rotation axis, a second center line M2 that passes through the center of the remote operation device 30 and extends in the longitudinal direction of the remote operation device 30. The first center line M1 (first rotation axis) and the second center line M2 (second rotation axis) are orthogonal to each other.

The first rotation operation direction is a rotation direction of the remote operation device 30 having the thickness direction of the remote operation device 30 as the rotation center, and the second rotation operation direction is a rotation direction of the remote operation device 30 having the longitudinal direction of the remote operation device 30 as the rotation center. In other words, the posture detection part 35 detects a change in the rotational position of the remote operation device 30 in the first rotation operation direction and a change in the rotational position of the remote operation device 30 in the second rotation operation direction.

The posture detection part 35 detects whether or not at least one of the first rotation operation and the second rotation operation is performed, and when at least one of the rotation operations is performed, detects the mode of the rotation operation, and outputs the detection result to the remote CPU 33. As a result, the remote CPU 33 may grasp the first rotation operation and the second rotation operation, which are a kind of operation on the remote operation device 30. The mode of the rotation operation includes a rotation angle and a rotation speed.

As shown in FIG. 2, the remote operation device 30 and the forklift truck 20 are configured to be able to wirelessly communicate. Specifically, the remote operation device 30 includes a remote communication part 41 that performs wireless communication, and the forklift truck 20 includes a vehicle communication part 42 that performs wireless communication with the remote communication part 41.

The remote communication part 41 and the vehicle communication part 42 are communication interfaces that perform wireless communication and ae realized by, for example, at least one of one or more dedicated hardware circuits, and one or more processors (control circuits) that operate according to a computer program (software).

When the paired (registered) forklift truck 20 exists within the communication range, the remote communication part 41 establishes a communication connection with the vehicle communication part 42 of the forklift truck 20. As a result, signals may be exchanged between the remote operation device 30 and the forklift truck 20.

In the present embodiment, the wireless communication format between the remote communication part 41 and the vehicle communication part 42 is Wi-Fi (in other words, wireless LAN of IEEE 802.11 standard). Both communication parts 41, 42 transmit and receive signals by packet communication.

Wi-Fi standards includes IEEE802.11a and IEEE802.11ac, but the wireless communication format between the remote communication part 41 and the vehicle communication part 42 may be any of the above plurality of standards.

Furthermore, the wireless communication format between the remote communication part 41 and the vehicle communication part 42 is not limited to Wi-Fi and is arbitrary, and may be, for example, Bluetooth (registered trademark) and Zigbee (registered trademark). Moreover, the transmission and reception of signals between the two communication parts 41, 42 are not limited to packet communication, and are arbitrary.

The remote communication part 41 is electrically connected to the remote CPU 33. The remote CPU 33 generates a remote operation signal SG1 used for remote operation of the forklift truck 20. The remote communication part 41 sequentially transmits the generated remote operation signal SG1 to the vehicle communication part 42. In other words, the remote CPU 33 is configured to transmit the remote operation signal SG1 using the remote communication part 41. The remote operation signal SG1 is a signal compatible with the wireless communication standard, and is a packet communication signal compatible with the Wi-Fi standard in the present embodiment.

As shown in FIG. 3, the remote operation signal SG1 is a signal in which various information regarding remote operation are set, and specifically, includes as the information regarding remote operation, traveling operation information D1 regarding traveling operation and cargo handling operation information D2 regarding cargo handling operation.

The traveling operation information D1 includes, for example, traveling speed information Dv in which the traveling speed of the forklift truck 20 is set, acceleration information Dα in which the acceleration of the forklift truck 20 is set, and steering angle information Dθ in which the steering angle of the fork truck 20 is set.

The cargo handling operation information D2 includes, for example, lift information Dfa in which the stroke amount of the lift operation is set, reach information Dfb in which the stroke amount of the reach operation is set, and tilt information Dfc in which the tilt angle of the tilt operation is set.

As shown in FIG. 2, the vehicle communication part 42 of the forklift truck 20 includes a signal conversion part 42a that converts the received remote operation signal SG1 of the wireless communication standard into a control signal corresponding to the in-vehicle communication standard. In the present embodiment, the specific in-vehicle communication standard with the forklift truck 20 complies is the CAN standard. That is, in this embodiment, the control signal is a CAN signal. However, this is not the sole case, and a specific in-vehicle communication standard is arbitrary.

The traveling operation information D1 and the cargo handling operation information D2 are set in the control signal. That is, the signal conversion part 42a converts the remote operation signal SG1 in compliance with the wireless communication standard into a control signal in compliance with the in-vehicle communication standard while holding both operation information D1 and D2 set in the remote operation signal SG1.

The vehicle communication part 42 is electrically connected to the vehicle CPU 27, and signals may be exchanged therebetween. The vehicle communication part 42 converts the remote operation signal SG1 into a control signal by using the signal conversion part 42a every time the vehicle communication part 42 receives the remote operation signal SG1, and temporarily stores the control signal in a buffer provided in the vehicle communication part 42.

The vehicle CPU 27 drives the forklift truck 20 (specifically, both actuators 26a and 26b) in a mode corresponding to the control signal stored in the buffer. The forklift truck 20 thereby performs an operation corresponding to the traveling operation information D1 and the cargo handling operation information D2 set in the remote operation signal SG1.

From the above, when the remote operation device 30 and the forklift truck 20 (specifically, both communication parts 41 and 42) are arranged within the communicable range, the remote operation of the forklift truck 20 is performed based on the remote operation signal SG1 between the communication parts 41 and 42.

A detailed configuration related to the remote operation control of the forklift truck using the remote operation device 30 will be described.

As shown in FIG. 2, a remote memory 34 stores a remote operation program 50 for executing various processes related to the remote operation of the forklift truck 20. The remote operation program 50 is an application program for performing a remote operation of the forklift truck 20 using the remote operation device 30.

The remote CPU 33 activates the remote operation program 50 (remote operation application) when a predefined remote operation activation condition is satisfied.

In the present embodiment, the remote operation activation condition is that the activation operation is performed on the remote operation device 30. In the configuration in which a remote operation icon is displayed on the touch screen 31, for example, the activation operation is an input operation to the remote operation icon.

However, the remote operation activation condition is not limited thereto and may be arbitrary, and for example, may be that the communication connection between the remote communication part 41 of the remote operation device 30 and the vehicle communication part 42 of the forklift truck 20 is established, or that the activation operation is performed under the condition that the communication connection between the communication parts 41, 42 is established. Note that the operation of the operator is not essential in the remote operation activation condition.

Accompanying the activation of the remote operation program 50, the remote CPU 33 first searches for forklift truck 20 with communication connection within a range where it may communicate with the remote communication part 41, and if such a forklift truck 20 exists, establishes a communication connection with the vehicle communication part 42 of the forklift truck 20.

Thereafter, the remote CPU 33 sets a neutral mode as the control mode (initial mode) at the time of activation, and displays a standby image G11, which is an image corresponding to the neutral mode, on the touch screen 31.

Here, the industrial vehicle remote operation system 10 of the present embodiment has a plurality of control modes for the forklift truck 20. Specifically, the industrial vehicle remote operation system 10 has a remote mode, a manned mode, and a neutral mode as the control modes. Each control mode will be described.

The remote mode is a control mode in which the operation of the forklift truck 20 is performed not through vehicle operation but through remote operation by the remote operation device 30. As shown in FIG. 4, when the control mode is the remote mode, the operation of the forklift truck 20 corresponding to the operation on the remote operation device 30 is performed, while the operation of the forklift truck 20 based on the vehicle operation is restricted (in other words, prohibited). When the control mode is the remote mode, an operation image G12 (see FIG. 6) is displayed on the touch screen 31.

The manned mode is a control mode in which the operation of the forklift truck is performed not through the remote operation by the remote operation device 30 but through the vehicle operation. As shown in FIG. 4, when the control mode is the manned mode, the operation of the forklift truck 20 corresponding to the vehicle operation is performed, while the remote operation of the forklift truck 20 by the remote operation device 30 is restricted (in other words, prohibited). When the control mode is the manned mode, the standby image G11 (see FIG. 5) different from the operation image G12 is displayed on the touch screen 31.

The neutral mode set at the time of activation of the remote operation program 50 is a control mode in which both the remote operation by the remote operation device and the operation of the forklift truck 20 based on the vehicle control are restricted (in other words, prohibited). When the control mode is the neutral mode, neither the operation of the forklift truck 20 through the remote operation by the remote operation device 30 nor the operation of the forklift truck 20 through the vehicle operation is performed. That is, the neutral mode is a control mode in which the operation of the forklift truck 20 is stopped and neither the remote operation by the remote operation device 30 nor the vehicle operation is accepted. When the control mode is the neutral mode, the standby image G11 is displayed on the touch screen 31.

Next, the standby image G11, which is an image corresponding to the neutral mode and the manned mode, and the operation image G12, which is an image corresponding to the remote mode, will be described.

Figure 5:
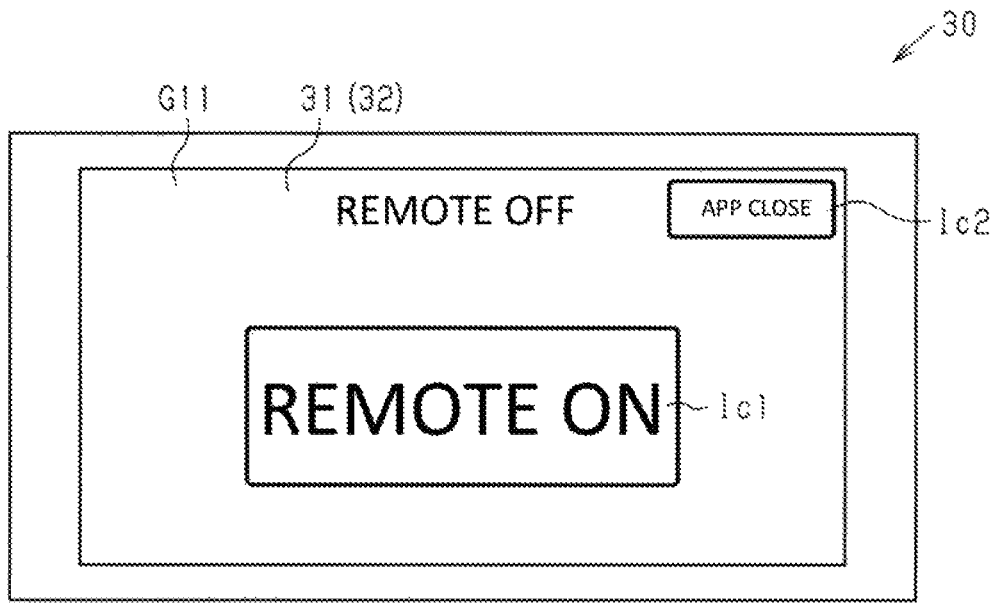
FIG. 5 is a front view of a remote operation device on which a standby image is displayed.

As shown in FIG. 5, in the standby image G11, an indication that the control mode is not the remote mode is displayed, and, for example, "remote OFF" is displayed near the upper end of the standby image G11. This is not the sole case, and a display norming the control mode currently set in the standby image G11 may be made.

Furthermore, in the standby image G11, a remote-operation start icon Ic1 and an application close con Ic2 are displayed. The operator may perform an input operation (tap) on the remote operation start icon Ic1 and the application close icon Ic2.

The remote-operation start icon Ic1 is arranged in the central portion of the standby image G11 and is larger than the application close icon Ic2. The display mode of the remote operation start icon Ic1 is different under a situation where the control mode may be shifted to the remote mode and under a situation where the control mode may not be shifted to the remote mode. Specifically, the remote operation start icon Ic1 is highlighted under a situation where the control mode may be set to the remote mode. The mode of highlighting is arbitrary, but for example, under a situation where the control mode may be shifted to the remote mode, the remote-operation start icon Ic1 is brightly displayed as compared with a situation where the control mode may not be shifted to the remote mode.

In the present embodiment, the situation where the control mode may be set to the remote mode is the situation where the control mode is the neutral mode. Furthermore, in the present embodiment, the situation where the control mode may not be set to the remote mode is the situation where the ono mode is the manned mode.

The application close icon Ic2 is provided, for example, in a corner portion of the standby image G11. In the application close icon Ic2, an indication to close the application is displayed.

The application close icon Ic2 is an icon used to end the remote operation program 50. Specifically, the remote CPU 33 executes an application closing process of ending the remote operation program 50 when an input operation to the application close con Ic2 is performed. The application closing process includes releasing the communication connection (pairing) between the communication parts 41 and 42, ending display of the standby image G11, and the like.

Explaining just in case, ending the remote operation program 50 and stopping the remote operation by the remote operation device 30 (in other words, stopping the remote mode) are different, and the remote operation program 50 is still in execution even if the remote mode is stopped. Therefore, there is a case where the remote mode is temporarily sopped and then restarted.

Note that the specific shapes, arrangements, and display modes of the remote-operation start icon Ic1 and the application close icon Ic2 are not limited to the above and are arbitrary. The display mode of the remote-operation start con Ic1 may be the same regardless of whether or not the control mode may be shifted to the remote mode.

Next, the operation image G12 will be described.

Figure 6:
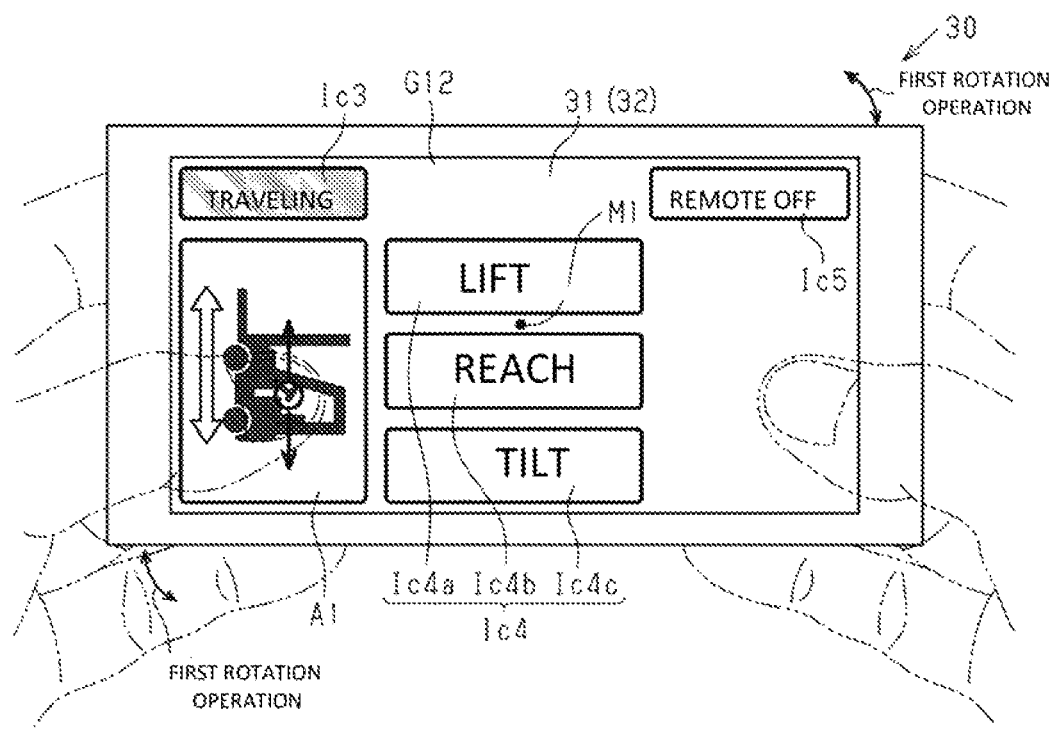
FIG. 6 is a front view of the remote operation device on which an operation image is displayed.

As shown in FIG. 6, the operation image G12 is displayed on the entire surface of the touch screen 31. In correspondence with the touch screen 31 having a shape with a longitudinal direction and a short direction (specifically, a rectangular shape), the operation image G12 has a shape with a longitudinal direction and a short direction (specifically, a rectangular shape).

In the operation image G12, an operation area A1 and a travel icon Ic3, a cargo handling icon Ic4, and a remote-operation stop icon Ic5 provided at positions different from the operation area A1 are displayed.

The operation area A1 is arranged on one of the opposite sides of the operation image G12 in the longitudinal direction of the operation image G12. The operation area A1 is provided at a position where a finger (e.g., thumb) of the left hand is naturally arranged when the remote operation device 30 is held with both hands. An image of the forklift truck 20 is displayed in the operation area A1.

The travel icon Ic3 is provided in the operation image G12 at a position spaced apart from the operation area A1 in the short direction of the touch screen 31. That is, the travel icon Ic3 and the operation area A1 are arrayed in the short direction.

The cargo handling icon Ic4 is arranged at the center portion of the operation image G12. The cargo handling icon Ic4 includes a lift icon Ic4a, a reach icon Ic4b, and a tilt icon Ic4c. The icons Ic4a to Ic4c are arrayed spaced apart from each other in the short direction of the touch screen 31. The shape and the positional relationship of the operation area A1 and each of the icons Ic3, Ic4a to Ic4c are not limited to the above and are arbitrary.

In the present embodiment, any of the icons Ic3, Ic4a to Ic4c is selected by being subjected to the input operation (e.g., tap), and the remote CPU 33 generates the remote operation signal SG1 so that the operation corresponding to the selected icon is performed in a mode corresponding to the operation mode for the operation area A1. For example, when the travel icon Ic3 is selected, the remote CPU 33 generates the remote operation signal SG1 so that the traveling is performed at the traveling speed and the acceleration corresponding to the operation mode for the operation area A1.

In the present embodiment, the icon selected in the operation image G12 is highlighted. For example, when the travel icon Ic3 is selected, as shown in FIG. 6, the travel icon Ic3 is highlighted than the cargo handling icon Ic4. The image in the operation area A1 may differ depending on the operation (traveling, lift operation, reach operation, and tilt operation).

The remote-operation stop icon Ic5 is an icon used by the operator to stop the remote operation. In the remote-operation stop icon Ic5, a display suggesting stopping the remote operation is made.

The remote-operation stop icon Ic5 is arranged, for example, on the opposite side of the operation area A1 in the operation image G12. That is, the operation area A1 and the remote-operation stop icon Ic5 are arranged spaced apart from each other and disposed respectively on opposite sides in the longitudinal direction of the operation image G12. Therefore, the remote-operation stop icon Ic5 is arranged at a position where it is easy to operate with the hand (the right hand in the present embodiment) different from the hand (the left hand in the present embodiment) that performs the input operation on the operation area A1.

Furthermore, the remote-operation stop con Ic5 as arranged above the center portion in the short direction of the operation image G12. Therefore, the operator may not tap the remote-operation stop icon Ic5 unless the operator intentionally places his/her finger above, and thus an erroneous operation is less likely to occur.

The remote CPU 33 sets the neutral mode as the initial control mode, displays the standby image G11 on the touch screen 31, and then reads a remote operation control process execution program 51 provided in the remote operation program 50 and regularly executes the remote operation control process.

The remote operation control process includes a process corresponding to each control mode and a shift process of the control mode. The remote CPU 33 performs the remote operation by the remote operation device 30 and the control of the control mode, and also performs the display control of the ouch screen 31 by regularly executing the remote operation control process. In the present embodiment, the remote operation control process execution program 51 corresponds to the "industrial vehicle remote operation program".

The remote operation control process will be described with reference to FIG. 7.

Figure 7:
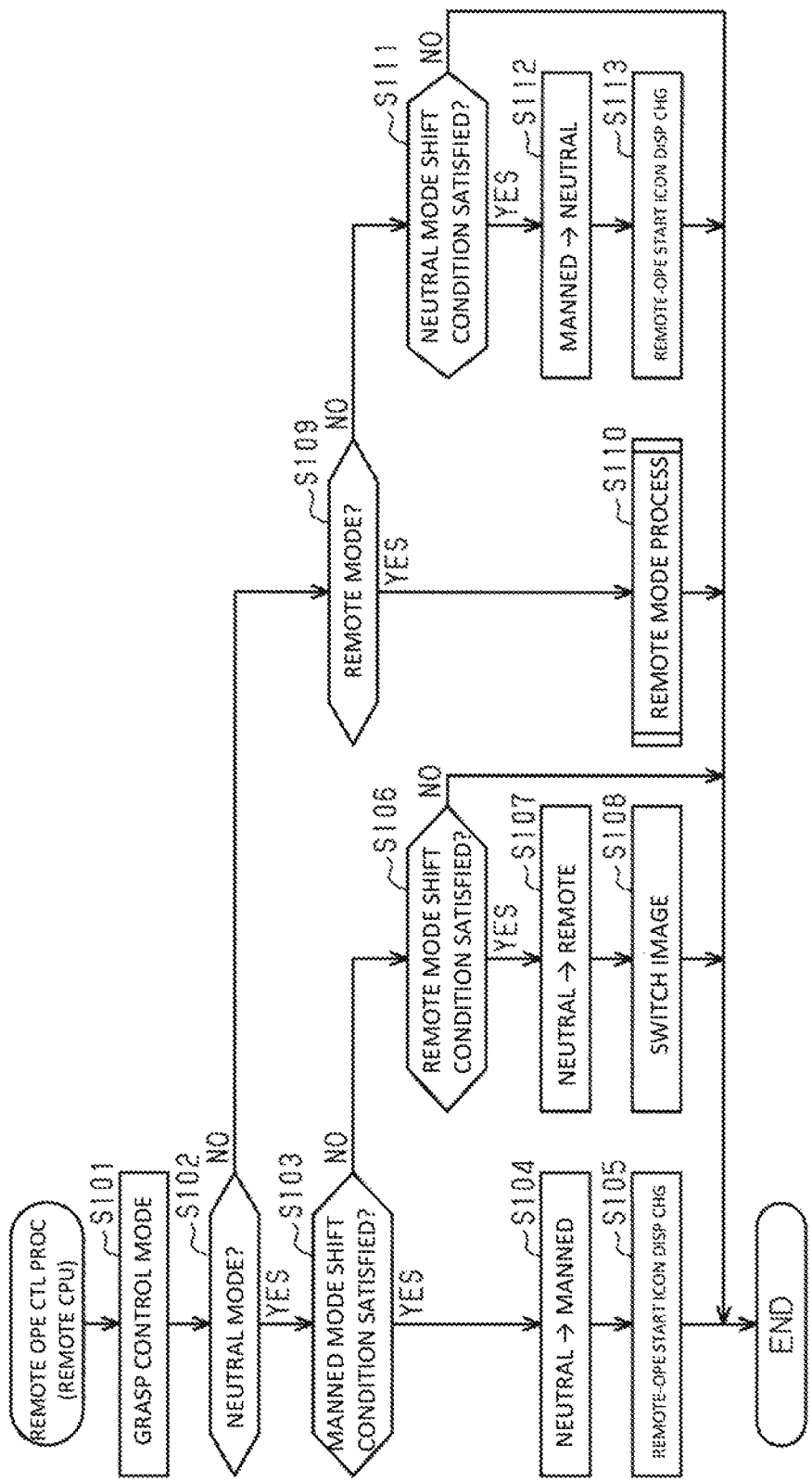
FIG. 7 is a flowchart of a remote operation control process in a first embodiment.

As shown in FIG. 7, in step S101, the remote CPU 33 first grasps the currently set control mode.

Although the specific configuration for grasping the control mode is arbitrary, for example, the remote memory 34 is provided with a storage area in which mode information for specifying the control mode is set, and the remote CPU 33 may grasp the control mode by referring to the mode information. In this case, the specific processing content when the control mode is initially set to the neutral mode at the time of activation is to set the mode information to the information corresponding to the neutral mode.

In the following step S102, the remote CPU 33 determines whether or not the currently set control mode is the neutral mode.

When the control mode is the neutral mode, the remote CPU 33 proceeds to step S103 and determines whether or not a predefined manned mode shift condition is satisfied.

Here, the manned mode shift condition under the neutral mode situation is that, for example, an occupant is present in the forklift truck 20, in other words, the occupant has been detected by the man sensor 25 provided in the forklift truck 20.

Specifically, the vehicle CPU 27 regularly determines the presence or absence of an occupant based on the detection result of the man sensor 25, and regularly transmits a signal indicating the determination result using the vehicle communication part 42. Specifically, the vehicle CPU 27 transmits a manned signal SG21 using the vehicle communication part 42 when the occupant is detected, while transmits an unmanned signal SG22 using the vehicle communication part 42 when the occupant is not detected. The remote CPU 33 may determine the presence or absence of an occupant based on the manned signal SG21 or the unmanned signal SG22 that is regularly received by the remote communication part 41.

In such a configuration, in step S103, the remote CPU 33 determines which one of the manned signal SG21 and the manned signal SG22 is the latest signal received by the remote communication part 41. Then, when the latest signal is the manned signal SG21, the remote CPU 33 determines that the manned mode shift condition is satisfied and proceeds to step S104, and shifts the control mode from the neutral mode to the manned mode. The specific processing content of step S104 is, for example, to update the mode information from that corresponding to the neutral mode to that corresponding to the manned mode.

Thereafter, in step S105, the remote CPU 33 performs a display change of the remote-operation start icon Ic1, and terminates the remote operation control process. Specifically, the remote CPU 33 ends the highlighting of the remote-operation start icon Ic1.

On the other hand, when the latest signal is the unmanned signal SG22, the remote CPU 33 determines that the manned mode shift condition is not satisfied and proceeds to step S106, and determines whether or not a predefined remote mode shift condition is satisfied.

The remote mode shift condition under the situation of the neutral mode in the present embodiment is, for example, that a predefined remote-operation start operation is performed on the remote operation device 30. The remote-operation start operation is, for example, an input operation (e.g., tap) to the remote-operation start con Ic1 of the standby image G11. However, the remote-operation start operation is not limited thereto and is arbitrary.

In step S106, the remote CPU 33 determines whether or not an input operation is made to the remote-operation start icon Ic1 based on the detection result of the touch sensor 32.

When there is no input operation to the remote-operation start icon Ic1, the remote CPU 33 determines that the remote mode shift condition is not satisfied and ends the remote operation control process as it is.

On the other hand, when there is an input operation to the remote-operation start icon Ic1, the remote CPU 33 determines that the remote mode shift condition is satisfied, and shifts the control mode from the neutral mode to the remote mode in step S107. The specific processing content of step S107 is, for example, to update the mode information from that corresponding to the neutral mode to that corresponding to the remote mode.

Thereafter, in step S108, the remote CPU 33 switches the image displayed on the touch screen 31 from the standby image G11 to the operation image G12, and ends the remote operation control process.

According to such a configuration, under a situation where it is the neutral mode, the control mode shifts from the neutral mode to the manned mode when the manned mode shift condition is satisfied, and shifts from the neutral mode to the remote mode when the remote mode shift condition is satisfied.

In particular, in the present embodiment the success/fail determination of the manned mode shift condition is performed before the success/fail determination of the remote mode shift condition, and thus when both shift conditions are satisfied at the same time, the control mode shifts to the manned mode preferentially over the remote mode.

Note that focusing on the fact that the process of step S106 is executed when the occupant has not been detected by the man sensor 25, the remote mode shift condition may also be that the occupant has not been detected by the man sensor 25 and the remote-operation start operation has been performed.

As shown in FIG. 7, when the control mode is not the neutral mode, the remote CPU 33 makes a negative determination in step S102, and proceeds to step S109. In step S109, the remote CPU 33 determines whether or not the current control mode is the remote mode. When the current control mode is the remote mode, the remote CPU 33 executes the remote mode process in step S110 and ends the remote operation control process.

The remote mode process w be described with reference to FIG. 8.

Figure 8:
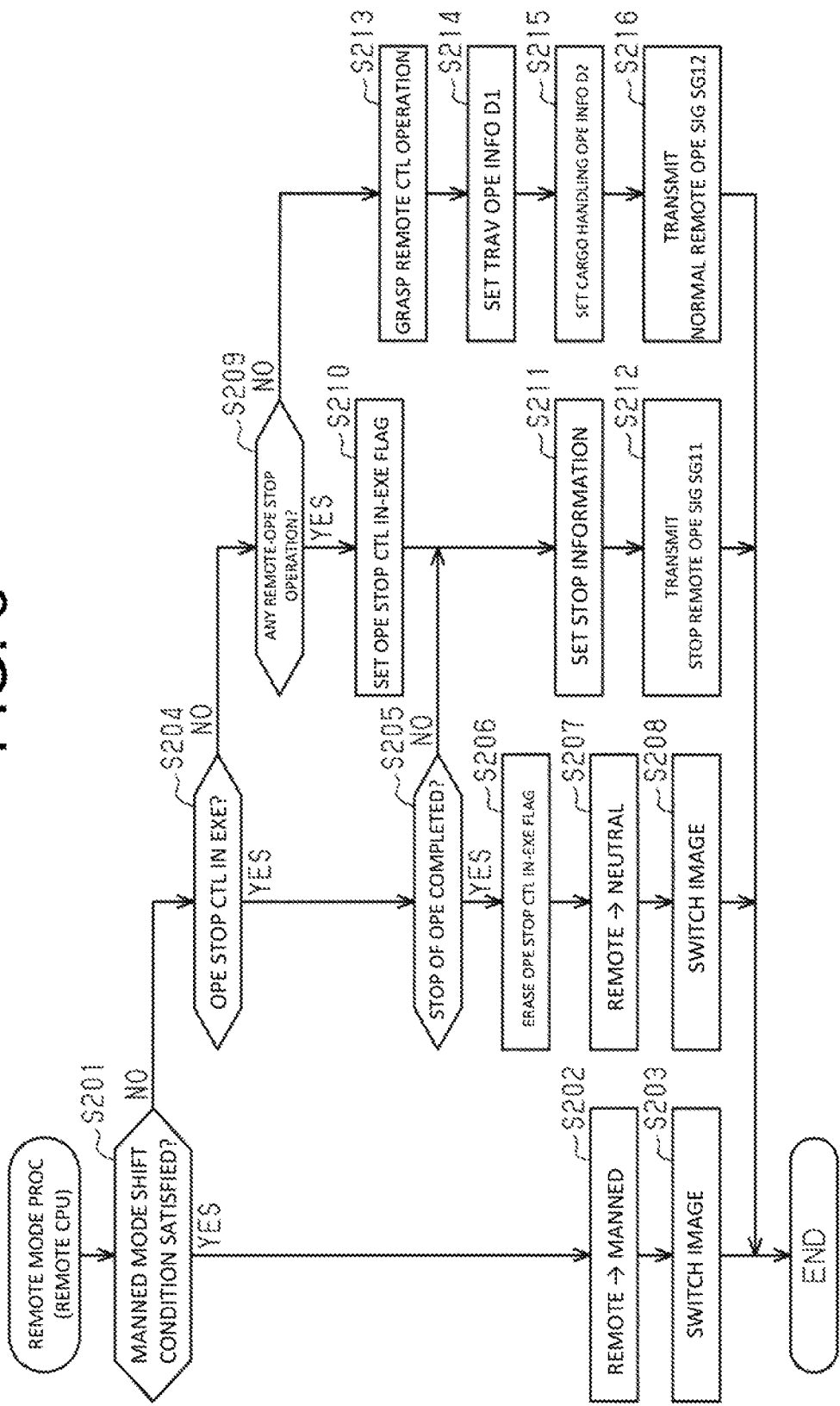
FIG. 8 is a flowchart of a remote mode process in the first embodiment.

As shown in FIG. 8, in step S201, the remote CPU 33 first determines whether or not the manned mode shift condition is satisfied.

Here, the manned mode shift condition in the remote mode is similar to that in the neutral mode, and is that the occupant is present on the forklift truck 20, that is, the occupant has been detected by the man sensor 25. Therefore, the process of step S201 is the same as that of step S103, and detailed description thereof will be omitted.

In the remote mode, unlike the neutral mode, operation of the forklift truck 20 may be performed. Therefore, in the present embodiment, the control mode shifts from the remote mode to the manned mode when the occupant has been detected by the man sensor 25 even under a situation where operation of the forklift truck 20 is performed.

However, this configuration is not the sole case, and for example, the control mode may be shifted from the remote mode to the manned mode when the operation of the forklift truck 20 is stopped and the occupant is detected by the man sensor 25. That is, the manned mode shift condition in the remote mode may be that the operation of the for truck 20 is stopped and an occupant is present in the forklift truck 20.

When the manned mode shift condition is satisfied, the remote CPU 33 proceeds to step S202, shifts the control mode from the remote mode to the manned mode, and in step S203, switches the image displayed on the touch screen 31 from the operation image G12 to the standby image G11, and ends the remote mode process.

On the other hand, when the manned mode shift condition is not satisfied, the remote CPU 33 makes a negative decision in step S201 and proceeds to step S204. In step S204, the remote CPU 33 determines whether or not the operation stop control for stopping the operation of the forklift truck 20 is being executed regardless of whether or not the remote operation device 30 is operated.

Specifically, for example, the remote memory 34 is provided with a storage area in which an operation stop control in-execution flag for determining whether or not the operation stop control is being executed is set. In step S204, the remote CPU 33 determines whether or not the operation stop control flag is set in the storage area.

When the operation stop control in-execution flag is set, the remote CPU 33 determines that the operation stop control is being executed, and proceeds to step S205, whereas when the operation stop control in-execution flag is not set, the remote CPU 33 determines that the operation stop control is not being executed, and proceeds to step S209.

For the sake of convenience of explanation, the processes of steps S209 to S212 will be described before the processes of steps S205 to S208.

In step S209, the remote CPU 33 determines whether or not the remote-operation stop operation is performed on the remote operation device 30.

Here, the remote-operation stop operation is, for example, an input operation to the remote-operation stop icon Ic5. In step S209, the remote CPU 33 determines whether or not an input operation is made to the remote operation stop con Ic5 based on the detection result of the touch sensor 32.

Then, when there is an input operation to the remote-operation stop icon Ic5, the remote CPU 33 makes an affirmative determination in step S209 and starts the operation stop control.

Specifically, in step S210, the remote CPU 33 first sets the operation stop control in-execution flag.

In the following step S211, the remote CPU 33 sets stop information, which is information for stopping the operation of the forklift truck 20, to the remote operation signal SG1 regardless of whether or not an operation is performed on the remote operation device 30.

The stop information includes the traveling operation information D1 including traveling speed information Dv in which the traveling speed (e.g., "T") corresponding to the stop of traveling of the forklift truck 20 is set, acceleration information Dα in which the forced stop deceleration is set, and steering angle information Dθ corresponding to neutral (e.g., "0"). Furthermore, the stop information includes the cargo handling operation information D2 corresponding to the slopping of the operation of the fork 22, and specifically incudes the cargo handling operation information D2 in which "0" is set in each piece of information Dfa, Dfb, and Dfc.

The forced stop deceleration is a parameter set in correspondence with the current traveling speed of the forklift truck 20, where for example, "0" is set when the traveling speed of the forklift truck 20 is "0", and a maximum deceleration within the range where deceleration may be safely performed at the relevant traveling speed is set when the traveling speed of the forklift truck 20 is not "0".

Thereafter, in step S212, the remote CPU 33 transmits a stop remote operation signal SG11, which is the remote operation signal SG1 in which the stop information is set, toward the vehicle communication part 42 using the remote communication part 41, and ends the remote mode process.

As shown in FIG. 8, when determined that the operation stop control is being executed in step S204, the remote CPU 33 proceeds to step S205 and determines whether or not the stopping of the operation of the forklift truck 20 is completed.

Specifically, the vehicle CPU 27 of the forklift truck 20 uses the vehicle communication part 42 to regularly transmit a vehicle signal in which the vehicle information indicating a vehicle state is set. Then, the remote CPU 33 grasps the vehicle state based on the vehicle information of the vehicle signal received by the remote communication part 41.

Here, the vehicle information includes information indicating the traveling speed of the forklift truck 20 and information indicating the operation condition of the fork 22. In step S205, the remote CPU 33 determines whether or not the traveling of the forklift truck 20 is stopped, that is, whether or not the traveling speed is "0", based on the vehicle information, and determines whether or not the operation of the fork 22 is stopped.

The signal conversion part 42a is used to transmit the vehicle signal. Specifically, the vehicle CPU 27 generates a control signal corresponding to the in-vehicle communication standard in which the vehicle information is set, and the signal conversion part 42a converts the control signal generated by the vehicle CPU27 to the vehicle signal complying with the wireless communication standard. Then, the vehicle communication part 42 transmits the vehicle signal toward the remote communication part 41.

When the stopping of the operation of the fork truck 20 is not completed, that is, when at least one of the traveling and the operation of the fork 22 is performed, the remote CPU 33 proceeds to step S211. Thus, the operation stop control is continuously executed. When the forklift truck 20 is decelerating, in step S211, the forced stop deceleration may be the same as the deceleration set by the stop remote operation signal SG11 of the previous time, or may be set to a different value to correspond to the current traveling speed.

On the other hand, when the stopping of the operation of the forklift truck 20 is completed, the remote CPU 33 makes an affirmative determination in step S205, and executes a process related to the ending of the operation stop control and the shifting of the control mode.

Specifically, in step S206, the remote CPU 33 erases the operation stop control in-execution flag. Then, in step S207, the remote CPU 33 shifts the control mode from the remote mode to the neutral mode in which remote operation by the remote operation device 30 is not performed. The remote operation by the remote operation device 30 is thereby stopped. In other words, the process of step S207 may be said to be a process of stopping the remote operation by the remote operation device 30.

Thereafter, in step S208, the remote CPU 33 switches the image displayed on the touch screen 31 from the operation image G12 to the standby image G11, and ends the remote mode process.

According to such a configuration, when the remote-operation stop operation is performed in a situation where operation of the forklift truck 20 is being performed through the remote operation by the remote operation device 30, the operation stop control for stopping the operation of the forklift truck 20 is continuously executed until the slopping of the operation of the forklift truck 20 is completed. Then, after the stopping of the operation of the forklift truck 20 is completed, the control mode is shifted from the remote mode to the neutral mode, and the remote operation by the remote operation device 30 is stopped.

Explaining just in case, when a remote operation stop operation is performed in a situation where the operation of the forklift truck 20 is stopped, the stop remote operation signal SG11 is transmitted in the remote mode process in which the remote-operation stop operation is performed. In this case, the operation stop state of the forklift truck 20 is maintained. Then, in the next remote mode process, the control mode shifts to the neutral mode. That is, when the remote operation stop operation is performed in a situation where the operation of the forklift truck 20 is stopped, the operation stop control is not substantially performed, and at substantially the same time, the control mode is shifted.

However, the configuration is not limited to the above, and for example, when the remote-operation stop operation is performed, the remote CPU 33 may determine whether or not the operation of the forklift truck 20 is performed, and when the operation is not performed, may directly execute the processes of step S207 and step S208.

In the present embodiment, the processes of steps S204 to S206 and S209 to S212 correspond to the "operation stop control" and the "operation stop control step", and the process of step S207 corresponds to the "remote operation stop step". Furthermore, the remote CPU 33 that executes the processes of steps S204 to S207 and S209 to S212 corresponds to the "remote-operation stop control part".

As shown in FIG. 8, when the remote-operation stop operation is not performed, the remote CPU 33 generates and transmits the remote operation signal SG1 corresponding to the remote control operation, which is a kind of operation on the remote operation device 30, in steps S213 to S216.

Specifically, in step S213, the remote CPU 33 first grasps the remote control operation on the remote operation device 30 based on the detection result of the touch sensor 32 and the detection result of the posture detection part 35. In the present embodiment, the remote control operation on the remote operation device 30 is at least one of an input operation, a first rotation operation, and a second rotation operation on the touch screen 31.

For example, the remote CPU 33 grasps whether or not there is a side operation triggered by an input operation on the operation area A1 as a kind of input operation on the operation area A1 based on the detection result of the touch sensor 32. The slide operation is a series of input operations in which the position where the input operation is performed moves while maintaining a state in which the input operation is performed on the touch screen 31.

Specifically, when the input operation is first performed in the operation area A1, and the input operation is continuously performed thereafter in a state where the input operation positions are continuous, the remote CPU 33 determines that the slide operation is performed, and grasps the relative position between the start position, which is the position where the input operation is performed first, and the position where the input operation is currently being performed.

Furthermore, the remote CPU 33 grasps, based on the detection result of the posture detection part 35, whether or not the first rotation operation is performed and, if the first rotation operation is performed, grasps the rotation angle thereof.

In the following step S214, the remote CPU 33 sets the traveling operation information D1 based on the grasped result of step S213. For example, when the travel con Ic3 is selected from among the icons Ic3, Ic4a to Ic4c, the remote CPU 33 sets the traveling speed information Dv and the acceleration information Dα based on the operation mode of the side operation on the operation area A1, and sets the steering angle information DO based on the operation mode of the first rotation operation.

Furthermore, for example, when anyone of the icons Ic3, Ic4a to Ic4c other than the travel icon Ic3 is selected, the remote CPU 33 sets the traveling operation information D1 corresponding to the traveling stop. The traveling operation information D1 corresponding to the traveling slop is, for example, traveling operation information D1 in which "0" is set to all of the traveling speed information Dv, the acceleration information Dα, and the steering angle information Dθ.

Thereafter, in step S215, the remote CPU 33 sets the cargo handling operation information D2 based on the grasped result of step S213. For example, when any of the icons Ic4a to Ic4c is selected, the remote CPU 33 sets the cargo handling operation information D2 corresponding to the selected icon.

Thereafter, in step S216, the remote CPU 33 transmits a normal remote operation signal SG12, which is a remote operation signal SG1 in which the traveling operation information D1 and the cargo handling operation information D2 corresponding to the remote control operation are set, toward the vehicle communication part 42 using the remote communication part 41, and ends the remote mode process.

According to such a configuration, the control mode shifts from the remote mode to the manned mode when the manned mode shift condition is satisfied in a situation where the control mode is the remote mode, whereas the control mode shifts from the remote mode to the neutral mode after the operation stop control is performed when the remote-operation stop operation is performed. Furthermore, when the manned mode shift condition is not satisfied and the remote-operation stop operation is not performed, the normal remote operation signal SG12 is transmitted so that the forklift truck 20 performs the operation corresponding to the remote control operation.

Here, since the determination process on whether or not the remote-operation stop operation is performed (step S209) is executed prior to the processes of steps S213 to S216, the process corresponding to the remote-operation stop operation is prioritized over the process corresponding to the remote control operation. Therefore, when the remote-operation stop operation and the remote control operation are simultaneously performed, the process corresponding to the remote operation stop operation, that is, the operation stop control and the shift of the control mode are prioritized.

Moreover, during the operation stop control, the slop remote operation signal SG11 is generated and transmitted regardless of whether or not the remote control operation is performed, whereas the transmission of the normal remote operation signal SG12 is prohibited as the execution of the processes of steps S213 to S216 is prohibited. Therefore, even if a remote control operation is performed on the remote operation device 30 in an attempt to operate the forklift truck 20 during the operation stop control, the forklift truck 20 does not perform an operation corresponding to the remote control operation.

Returning to the explanation of FIG. 7, when the current control mode is not the remote mode in step S109, this means that the current control mode is the manned mode. In this case, the remote CPU 33 proceeds to step S111 and determines whether or not a predefined neutral shift condition is satisfied.

Here, the neutral shift condition under a situation of the manned mode is, for example, that the occupant has not been detected by the man sensor 25 and the operation of the forklift truck 20 is stopped.

In step S111, the remote CPU 33 determines whether or not the signal most recently received as a signal for specifying the presence or absence of an occupant is the manned signal SG21 or the unmanned signal SG22, and determines whether or not both the traveling and the fork 22 are slopped based on the vehicle information set in the most recently received vehicle signal.

When the occupant has not been detected by the man sensor 25 and the operation is stopped, specifically, when the signal most recently received as the signal for specifying the presence or absence of the occupant is the unmanned signal SG22, and both the traveling and the fork 22 are stopped, this means that the neutral shift condition is satisfied. In this case, the remote CPU 33 shifts the control mode from the manned mode to the neutral mode in step S112.

Thereafter, in step S113, the remote CPU 33 performs a display change of the remote operation start icon Ic1, and ends the remote operation control process. Specifically, the remote CPU 33 highlights the remote-operation start con Ic1 so as to urge an input operation on the remote operation start icon Ic1.

On the other hand, when the occupant has been detected by the man sensor or the operation of the forklift truck 20 is not stopped, the remote CPU 33 determines that the neutral shift condition is not satisfied and ends the remote operation control process as it is. In this case, the control mode is maintained in the manned mode.

According to this configuration, under a situation of the manned mode, the control mode shifts from the manned mode to the neutral mode based on the fact that the occupant is absent and the operation is stopped. Thus, the manned mode may be suppressed from being continued in a state where the occupant is absent.

Furthermore, in the present embodiment, the control mode shifts to the neutral mode after the operation of the forklift truck 20 is stopped, and thus in the neutral mode of the present embodiment, the operation of the forklift truck 20 is not performed including the control for shopping the operation.

In the present embodiment, the remote CPU 33 that executes the processes of steps S103 and S104 corresponds to the "manned mode shift pet", and the remote CPU 33 that executes the processes of steps S106 and S107 corresponds to the "remote mode shift part". Furthermore, the remote CPU 33 that executes the processes of steps S111 and S112 corresponds to the "neutral mode shift part".

During the activation of the remote operation program 50, specifically, under a situation where communication connection is established between the remote communication part 41 and the vehicle communication part 42, the vehicle CPU 27 reads out a vehicle control process execution program 60 (see FIG. 2) stored in the vehicle memory 28, and repeatedly executes the vehicle control process including the control process of each actuator 26a, 26b.

The vehicle control process will be described with reference to FIG. 9.

Figure 9:
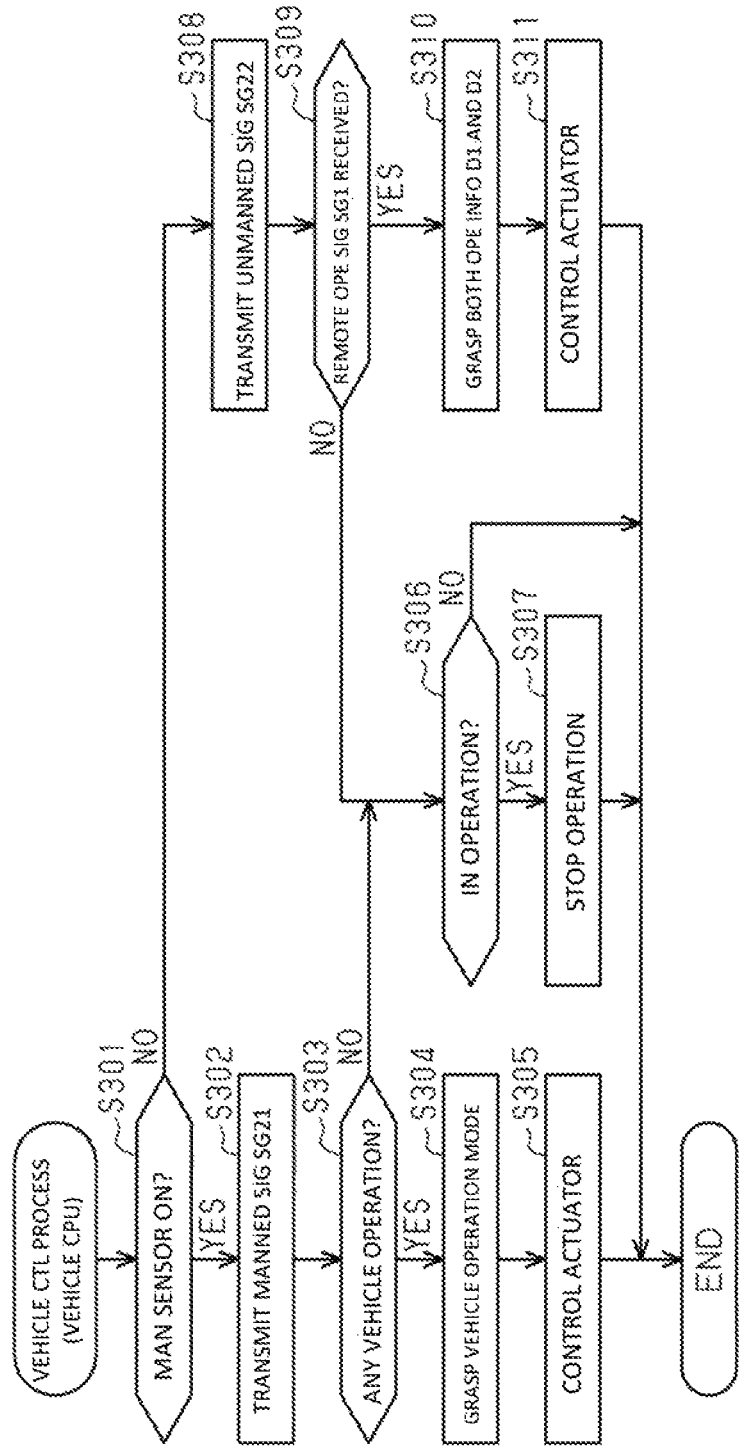
FIG. 9 is a flowchart of a vehicle control process in the first embodiment.

As shown in FIG. 9, in step S301, the vehicle CPU 27 first determines whether or not the man sensor 25 detects an occupant, specifically, the man sensor 25 is in the ON state.

When the man sensor 25 is in the ON state, in step S302, the vehicle CPU 27 transmits the manned signal SG21 toward the remote communication part 41 using the vehicle communication part 42.

Thereafter, in steps S303 to S305, the vehicle CPU 27 controls each actuator 26a and 26b so that the forklift truck 20 is operated in correspondence with the vehicle operation which is an operation on the forklift truck 20.

Specifically, in step S303, the vehicle CPU 27 first determines whether or not a vehicle operation is performed. The vehicle operation is the operation of the steering wheel 23 and the operation of the operation lever 24, as described above.

The forklift truck 20 has various sensors that detect the operation of the steering wheel 23 and the operation of the operation lever 24, and the vehicle CPU 27 may grasp the presence or absence as well as the operation mode of each operation based on the detection results of the various sensors.

Wen the vehicle operation is performed, the vehicle CPU 27 proceeds to step S304 and grasps the vehicle operation mode which is the operation mode of the vehicle operation. The vehicle operation mode is, for example, the rotation angle of the steering wheel 23, the operation amount of the operation lever 24, or the like.

Then, in step S305, the vehicle CPU 27 controls each actuator 26a and 26b based on the vehicle operation mode and ends the vehicle control process.

On the other hand, when the vehicle operation is not performed, the vehicle CPU 27 makes a negative determination in step S303, and proceeds to step S306. In step S306, the vehicle CPU 27 determines whether or not the forklift truck 20 is moving.

The vehicle CPU 27 ends the vehicle control process as it is when the forklift truck 20 is not moving, that is, when traveling is stopped and the fork 22 is stopped. On the other hand, the vehicle CPU 27 controls each actuator 26a, 26b to stop the operation in step S307 and then ends the vehicle control process when the forklift truck 20 is moving, that is, during traveling or during operation of the fork 22.

With such a configuration, the operation of the forklift truck 20 is performed based on the vehicle operation only when the occupant has been detected by the man sensor 25. Furthermore, even when the occupant has been detected by the man sensor 25, the operation of the forklift truck 20 is automatically stopped when the vehicle operation has not been performed.

As shown in FIG. 9, when the man sensor 25 is not in the ON state, that is, when the occupant has not been detected by the man sensor 25, the vehicle CPU 27 makes a negative determination in step S301 and proceeds to step S308. In step S308, the vehicle CPU 27 uses the vehicle communication part 42 to transmit the unmanned signal SG22 to the remote communication part 41.

That is, in the present embodiment, the vehicle CPU 27 transmits either the manned signal SG21 or the unmanned signal SG22, which is a signal for specifying the presence or absence of an occupant, using the vehicle communication part 42 every time the vehicle control process is executed. Since the vehicle control process is repeatedly executed, the manned signal SG21 or the unmanned signal SG22 is repeatedly (in other words, regularly) transmitted. Thus, the remote CPU 33 may grasp the presence or absence of an occupant.

Thereafter, in step S309, the vehicle CPU 27 determines whether or not vehicle communication part 42 is receiving the remote operation signal SG1 (specifically, stop remote operation signal SG11 or normal remote operation signal SG12).

Specifically, as described above, the vehicle communication part 42 converts the remote operation signal SG1 into a control signal by using the signal conversion part 42a when the remote operation signal SG1 is received, and temporarily stores the control signal in the buffer. In such a configuration, the vehicle CPU 27 determines in step S309 whether or not the control signal is stored in the buffer.

When the control signal is not stored in the buffer, vehicle CPU 27 determines that the remote operation signal SG1 as not received, and proceeds to step S308. On the other hand, when the control signal is stored in the buffer, the vehicle CPU 27 determines that the remote operation signal SG1 is received, and in steps S310 and S311, controls each actuator 26a, 26b so that the forklift truck 20 is operated in correspondence with the remote operation signal SG1.

Specifically, in step S310, the vehicle CPU 27 first reads out the control signal stored in the buffer and grasps both operation information D1 and D2 included in the control signal. The control signal stored in the buffer is erased based on being read by the vehicle CPU 27.

Thereafter, in step S311, the vehicle CPU 27 controls the actuators 26a and 26b based on the operation information D1 and D2, and ends the vehicle control process. In this case, the forklift truck 20 performs an operation corresponding to the remote control operation when the received remote operation signal SG1 is the normal remote operation signal SG12, whereas the forklift truck 20 stops the operation or maintains a state in which the operation is stopped when the received remote operation signal SG1 is the stop remote operation signal SG11.

With such a configuration, the operation of the forklift truck 20 based on the remote operation signal SG1 is performed when the occupant has not been detected by the man sensor 25. Furthermore, even when the occupant has not been detected by the man sensor 25, if the vehicle communication part 42 has not received the remote operation signal SG1 for some reason such as communication failure, the operation of the forklift truck 20 is automatically stopped.

The remote CPU 33 that executes the processes of steps S213 to S216 corresponds to the "normal transmission control part", and the vehicle CPU 27 that executes the processes of steps S310 and S311 corresponds to the "remote drive control part". The remote CPU 33 that executes the processes of steps S213 to S216 and the vehicle CPU 27 that executes the processes of steps S310 and S311 correspond to the "normal remote control pert".

Next, as an operation of the present embodiment, the relation between the neutral mode, the remote mode, and the manned mode will be described with reference to FIG. 10.

Figure 10:
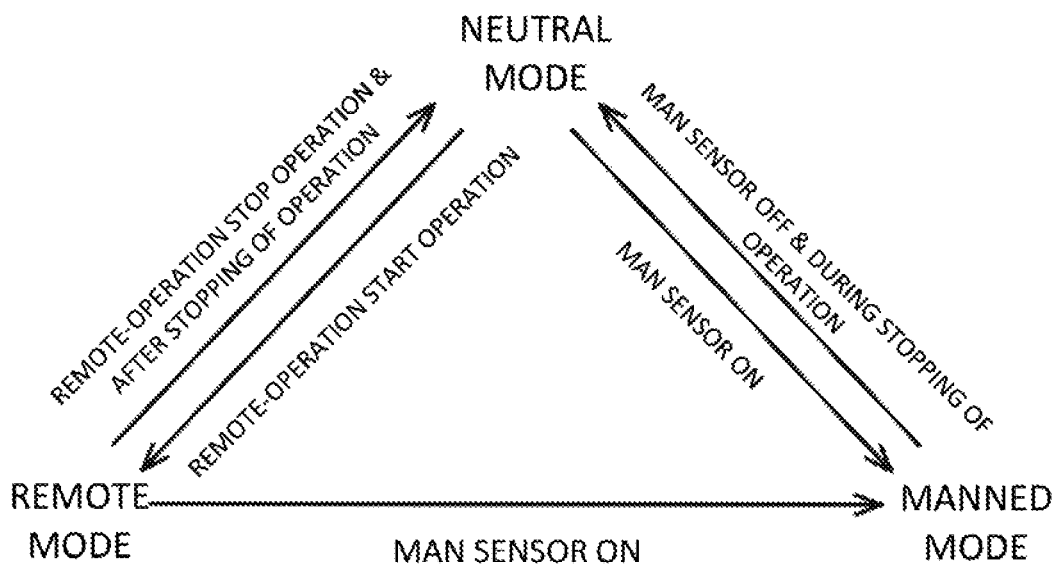
FIG. 10 is a correlation diagram of the control modes in the first embodiment.

As shown in FIG. 10, in the remote mode, the operation stop control is performed based on a fact that the remote-operation stop operation has been performed, and the mode shifts to the neutral mode after the operation stop control is completed, and shifts to the manned mode based on the man sensor 25 being turned to the ON state. In addition, after the operation stop control is completed is ater the operation of the forklift truck 20 is stopped.

In the neutral mode, the mode shifts to the remote mode based on a fact that the remote-operation start operation has been performed on the remote operation device 30, and shifts to the manned mode based on the man sensor 25 being turned to the ON state.

In the manned mode, the mode shifts to the neutral mode when the man sensor 25 is in the OFF state and the operation of the forklift truck 20 is stopped.

According to such a configuration, for example, if it is desired to directly operate the forklift truck 20 when the operation of the forklift truck 20 is performed through the remote operation by the remote operation device 30, the operator may perform the remote-operation stop operation on the remote operation device 30 and then ride on the forklift truck 20. As a result, the operation of the forklift truck 20 is stopped, and then the control mode is shifted in a manner of the remote mode→neutral mode→manned mode. The forklift truck 20 thus may be maneuvered by vehicle operation.

In the present embodiment, the direct shift from the manned mode to the remote mode is not executed. That is, when the remote operation is performed using the remote operation device 30 in a situation where the control mode is the manned mode, it is necessary to get off from the forklift truck 20 and perform the remote-operation start operation on the remote operation device 30. As a result, the unintended operation does not occur in the forklift truck 20 due to the automatic start of the remote operation by the remote operation device 30 by getting off from the forklift truck 20.

The present embodiment described in detail above has the following effects.

(1-1) The industrial vehicle remote operation system 10 includes a forklift truck having a vehicle communication pert 42 that performs wireless communication, and a remote operation device 30 having a remote communication part 41 that performs wireless communication with the vehicle communication part 42 and being used to remotely operate the forklift truck 20. The remote CPU 33 of the industrial vehicle remote operation system 10 performs the operation stop control for stopping the operation of the forklift truck 20 based on a fact that the remote-operation stop operation has been performed on the remote operation device 30 in a situation where the operation of the forklift truck 20 is performed through the remote operation by the remote operation device 30. Then, the remote CPU 33 stops the remote operation by the remote operation device 30 after the operation stop control is completed.

According to such a configuration, the operation stop control is performed by performing the remote-operation stop operation in a situation where the forklift truck 20 is operated through the remote operation by the remote operation device 30, and the remote operation by the remote operation device 30 is stopped after the operation stop control is completed. Thus, when the remote operation is to be stopped during the operation of the forklift truck 20, the remote-operation stop operation is to be performed without performing the remote operation for stopping the operation. Therefore, even if the remote operation for stopping the operation is forgotten, a disadvantage in that the operation of the forklift truck 20 is continuously performed after the remote operation is stopped may be suppressed, and the safety may be enhanced. Furthermore, since the operator does not need to perform the remote operation for stopping the operation, the operation required for stopping the remote operation may be simplified, and the operator may shift to another work at an early stage.

(1-2) The forklift truck 20 includes a steering wheel 23 and an operation lever 24 as a vehicle operation part. The industrial vehicle remote operation system 10 has a remote mode, a manned mode, and a neutral mode as control modes of the forklift truck 20. The remote mode is a control mode in which the operation of the forklift truck 20 is performed not through vehicle operation, which is an operation on the steering wheel 23 and the operation lever 24, but trough remote operation by the remote operation device 30. The manned mode is a control mode in which the operation of the forklift truck 20 is performed not through remote operation by the remote operation device 30 but through vehicle operation. The neutral mode is a control mode in which neither the operation of the industrial vehicle through the remote operation by the remote operation device 30 nor the operation of the industrial vehicle through the vehicle operation is performed. In other words, the neutral mode is a control mode in which the operation of the forklift truck 20 is prohibited regardless of whether or not the remote control operation and the vehicle operation are performed.

In such a configuration, the remote CPU 33 performs the operation stop control based on a fact the remote-operation stop operation has been performed during the operation of the forklift truck 20 in the remote mode, and shifts the control mode from the remote mode to the neutral mode after the operation stop control is completed.

According to this configuration, the operation based on the vehicle operation is not performed in the remote mode. Thus, the behavior of the forklift truck 20 may be suppressed from becoming unstable due to the remote operation by the remote operation device 30 and the vehicle operation being performed simultaneously.

Similarly, in the manned mode, the remote operation by the remote operation device 30 is not performed, and thus, for example, the behavior of the forklift truck 20 may be suppressed from becoming unstable due to the remote operation by the remote operation device 30 being performed during the operation of the forklift truck 20 by the vehicle operation.

Furthermore, according to this configuration, after the operation stop control is completed, the control mode shills from the remote mode to the neutral mode. The remote operation by the remote operation device 30 is thereby stopped. In this case, since the control mode after the operation stop control is completed becomes the neutral mode in which the operation of the forklift truck 20 is not performed, the erroneous operation of the forklift truck 20 that may occur when the control mode is switched may be suppressed, and the safety may be further enhanced. For example, the forklift truck is not operated even when the vehicle operation is performed immediately after the end of the operation stop control. Thus, the operation of the forklift truck 20 is not performed even, for example, if the operator accidentally touches the steering wheel 23 or the like when getting on the vehicle after the operation is stopped.

(1-3) The forklift truck 20 includes a man sensor 25 that detects an occupant in the forklift truck 20. The remote CPU 33 executes the process of shifting the control mode from the neutral mode to the manned mode (step S103 and step S104) based on the satisfaction of the manned mode shift condition in the neutral mode. The manned mode shift condition in this case is that the occupant has been detected by the man sensor 25.

According to this configuration, when the occupant is detected, the control mode shifts from the neutral mode to the manned mode. As a result, the operation of the forklift truck 20 is performed based on the vehicle operation by the occupant. Therefore, the operation of the forklift truck 20 based on the vehicle operation in a stale where the occupant is not riding the vehicle may be restricted, and the safety may be further enhanced.

In particular, in the present embodiment, the control mode automatically shifts to the manned mode when the operator gets on the vehicle, so that it is not necessary to pay particular attention to the shift of the control mode. As a result, a smooth operation of the forklift truck 20 may be realized.

(1-4) The remote CPU 33 executes the process of shifting the control mode from the neutral mode to the remote mode (step S106 and step S107) based on a fact that the remote-operation start operation has been performed on the remote operation device 30 in the neutral mode.

According to this configuration, in order to shift the control mode to the remote mode, the remote-operation start operation needs to be performed in the neutral mode. Thus, the shift to the remote mode, which is against the operator's intention, may be suppressed, and the remote operation by the remote operation device 30 may be suppressed tom being accidentally performed.

(1-5) The remote CPU 33 executes the process of shifting the control mode from the manned mode to the neutral mode (step S111 and step S112) based on satisfaction of the neutral shift condition in the manned mode. The neutral shift condition in the manned mode includes the fact that the occupant has not been detected by the man sensor 25.

According to this configuration, in the manned mode, when the neutral shift condition including the absence of the occupant is satisfied, the control mode shifts from the manned mode to the neutral mode. Thus, the manned mode may be suppressed from being continued in a slate where the occupant is absent.

(1-6) The remote operation device 30 includes a touch screen 31 serving as a display screen. The remote CPU 33 displays the operation image G12 on the touch screen 31 when the control mode is the remote mode, and displays the standby image G11 different from the operation image G12 on the display screen when the control mode is not the remote mode, that is, when the control mode is the manned mode or the neutral mode.

With this configuration, the operator may easily check whether or not the current control mode is the remote mode by looking at the displayed image. This may suppress the false recognition of the control mode.

(1-7) The remote-operation stop operation is an input operation to the remote-operation stop icon Ic5 displayed in the operation image G12.

According to this configuration, the operation stop control is performed and the remote operation by the remote operation device 30 is stopped by the operator performing the input operation to the remote operation stop con Ic5. Thus, the remote operation by the remote operation device 30 may be stopped by a relatively simple operation.

(1-8) The remote mode is a control mode in which the operation of the forklift truck 20 is performed based on a fact that the remote control operation that has been performed on the remote operation device 30. The remote control operation incudes an input operation (slide operation in the present embodiment) on the operation area A1 displayed in the operation image G12. The operation area A1 and the remote-operation stop icon Ic5 are arranged spaced apart from each other and disposed respectively on opposite sides of the operation image G12.

With this configuration, the input operation on the operation area A1 and the input operation to the remote-operation stop icon Ic5 are less likely to interfere with each other. The erroneous operation thus may be suppressed. Furthermore, since the operation area A1 and the remote-operation stop icon Ic5 are arranged on opposite sides of the operation image G12, when the remote operation device 30 is gripped with both hands, the input operation on the operation area A1 may be performed with one hand, and the input operation to the remote operation stop icon Ic5 may be performed with the other hand. The remote-operation stop operation thus may be easily performed even during the remote control operation.

(1-9) The remote CPU 33 executes the process of controlling (steps S213 to S216 and steps S310, S311) so that the operation of the forklift truck 20 corresponding to the remote control operation is performed based on a fact that the remote control operation has been performed on the remote operation device 30 in a situation where the control mode is the remote mode.

In such a configuration, when the remote-operation stop operation and the remote control operation have been simultaneously performed on the remote operation device 30, the remote CPU 33 preferentially executes the process corresponding to the remote-operation stop operation (specifically, operation stop control and stopping of remote operation) over the process corresponding to the remote control operation.

According to this configuration, when the remote-operation stop operation and the remote control operation are simultaneously performed on the remote operation device 30, the operation stop control and the stopping of the remote operation are preferentially performed. Thus, the operation corresponding to the remote control operation may be suppressed from being continuously performed even if the remote-operation stop operation has been performed.

In particular, according to the present embodiment, since it is not necessary to perform the remote-operation stop operation after the remote control operation is stopped, the operation for slopping the remote operation may be simplified.

(1-10) The vehicle CPU 27 of the forklift truck 20 executes a vehicle control process including the process (steps S310, S311) for driving the forklift truck 20 (specifically, each actuator 26a, 26b) based on the remote operation signal SG1 received by the vehicle communication part 42. The remote CPU 33 performs remote operation of the forklift truck 20 by transmitting the remote operation signal SG1 using the remote communication part 41.

In such a configuration, the remote CPU 33 transmits the normal remote operation signal SG12 corresponding to the remote control operation using the remote communication part 41 when not in the operation stop control in the remote mode (steps S213 to S216). On the other hand, the remote CPU 33 transmits the stop remote operation signal SG11 for stopping the operation of the forklift truck 20 using the remote communication part 41 when in the operation stop control in the remote mode (steps S211, S212).

According to such a configuration, the forklift truck 20 (vehicle CPU 27) does not need to grasp whether or not the remote-operation stop operation is performed, and may be driven as usual even based on the remote operation signal SG1 even at the time of the operation stop control. Thus, the complication of the vehicle control process accompanying the execution of the operation stop control may be suppressed.

Furthermore, since the operation stop control may be performed without changing the specific processing contents of the vehicle control process of drive controlling each actuator 26a and 26b based on the remote operation signal SG1, the operation stop control and the stopping of the remote operation may be easily applied on the forklift truck 20 to be remotely operated.

(1-11) The remote operation program 50 serving as an industrial vehicle remote operation program is for remotely operating the forklift truck 20 including the vehicle communication part 42 using the remote operation device 30 including the remote communication part 41. The remote operation program 50, specifically, the remote operation control process execution program 51 included in the remote operation program 50, causes the remote operation device 30 (specifically, the remote CPU 33) to perform the operation stop control and stop the remote operation after the operation stop control is completed. The effect of (1-1) is thereby achieved.

(1-12) The industrial vehicle remote operation method for remotely operating the forklift truck 20 including the vehicle communication part 42 using the remote operation device 30 including the remote communication part 41 that performs wireless communication includes an operation stop control step in which the remote CPU 33 performs the operation stop control and a remote operation stop step of stopping the remote operation by the remote operation device 30 after the operation stop control is completed. The effect of (1-1) is thereby achieved.

Second Embodiment

Figure 11:
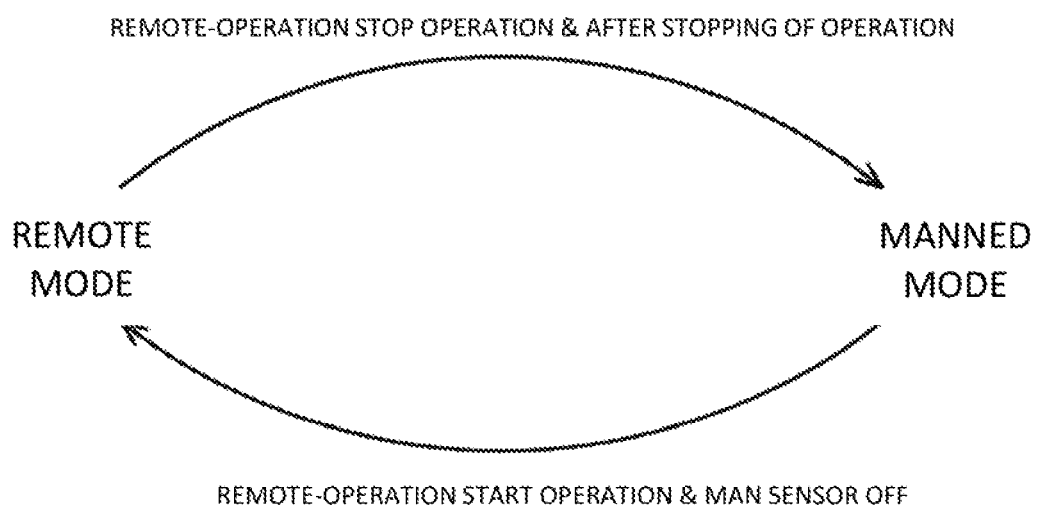
FIG. 11 is a correlation diagram of the control modes in the second embodiment.

As shown in FIG. 11, in the present embodiment, there are two types of control modes, a remote mode and a manned mode, and the neutral mode is not set. In the present embodiment, the control mode set at the time of activation of the remote operation program 50, that is, the initial control mode is the remote mode. Therefore, the image displayed on the touch screen 31 at the time of activation is the operation image G12.

Furthermore, in the present embodiment, the shift condition from the remote mode to the manned mode is ater the remote-operation stop operation is performed on the remote operation device 30 and the operation stop control accompanying therewith is completed (after the stopping of the operation). Further, the shift condition from the manned mode to the remote mode (remote mode shift condition) is that the remote-operation start operation is performed on the remote operation device 30 and the occupant has not been detected by the man sensor 25.

The remote operation control process of the present embodiment will be described with reference to FIG. 12.

Figure 12:
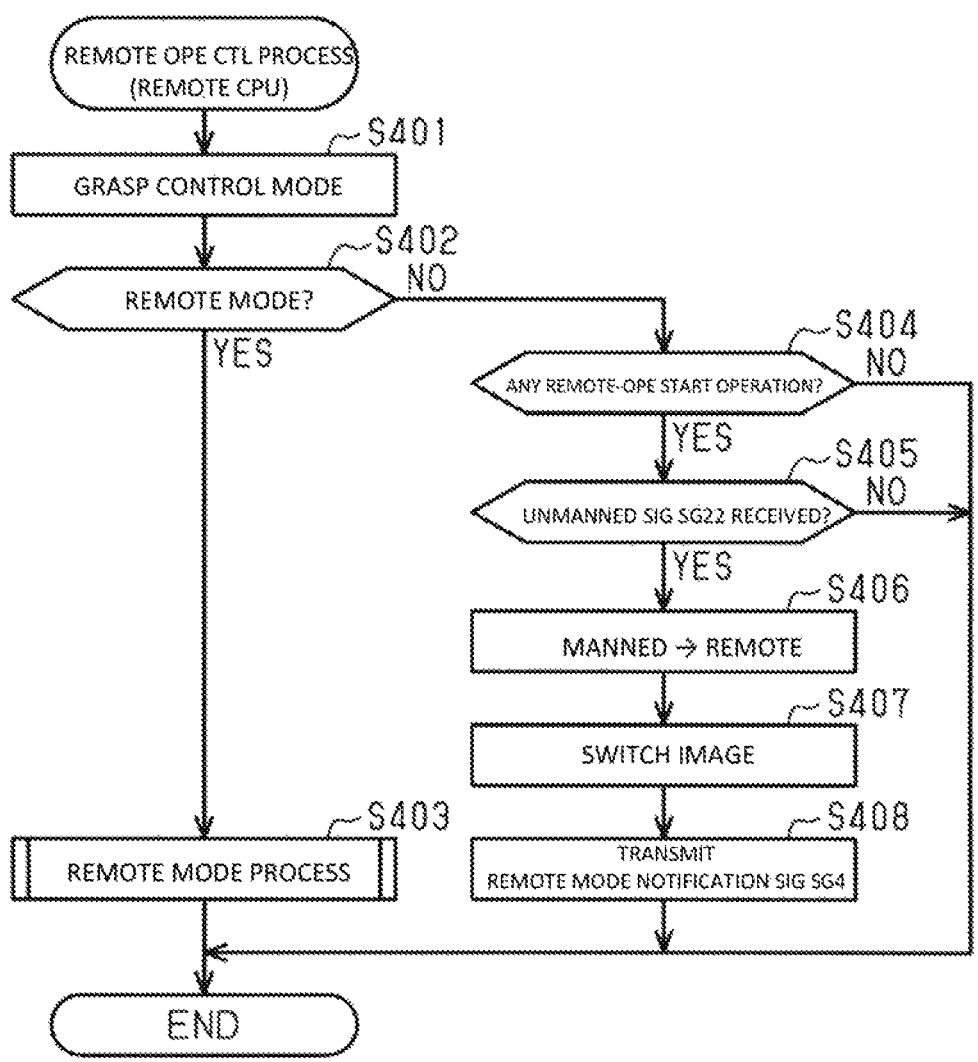
FIG. 12 is a flowchart of a remote operation control process in the second embodiment.

As shown in FIG. 12, in step S401, the remote CPU 33 first grasps the current control mode.

Then, in step S402, the remote CPU 33 determines whether or not the current control mode is the remote mode. When the current control mode is the remote mode, the remote CPU 33 executes the remote mode process in step S403, and ends the remote operation control process.

The remote mode process of the present embodiment will be described with reference to FIG. 13.

Figure 13:
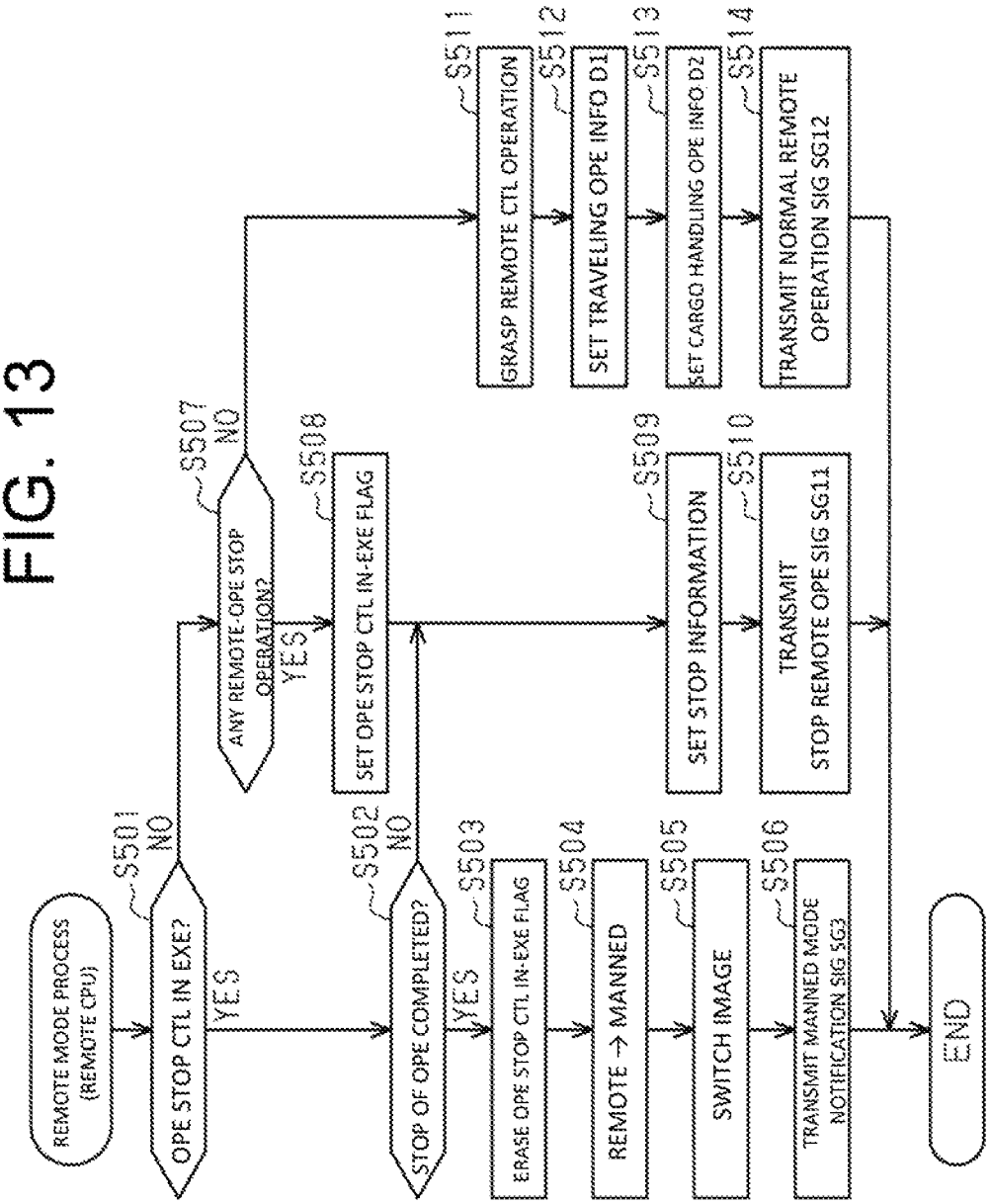
FIG. 13 is a time chart of a remote mode process in the second embodiment.

As shown vin FIG. 13, in the remote mode process of the present embodiment, the remote CPU 33 determines in step S501 whether or not the operation stop control is being performed, and proceeds to step S502 when the operation stop control is being performed.

In step S502, the remote CPU 33 determines whether or not the stopping of the operation of the forklift truck 20 is completed. The remote CPU 33 proceeds to step S509 when the stopping of the operation is not completed, and executes the processes of steps S503 to S505 when the slopping of the operation is completed.

Specifically, the remote CPU 33 erases the operation stop control in-execution flag in step S503, and shifts the control mode from the remote mode to the manned mode in step S504. Then, in step S505, the remote CPU 33 switches the image displayed on the touch screen 31 from the operation image G12 to the standby image G11.

Thereafter, in step S506, the remote CPU 33 transmits the manned mode notification signal SG3 for notifying that the control mode is the manned mode using the remote communication part 41, and ends the remote mode process. Note that the processes of steps S501 to S505 are similar to the processes of steps S204 to S208 of the first embodiment, and thus detailed description thereof will be omitted.

When the operation stop control is not being performed, the remote CPU 33 executes the processes of steps S507 to S514. The processes of steps S507 to S514 are similar to the processes of steps S209 to S216 of the first embodiment, and thus detailed description thereof will be omitted.

As shown in FIG. 12, when the current control mode is not the remote mode, that is, when the current control mode is the manned mode, the remote CPU 33 makes a negative determination in step S402, and proceeds to step S404.

In step S404, the remote CPU 33 determines whether or not a remote-operation start operation has been performed on the remote operation device 30. When the remote-operation start operation has been performed, the remote CPU 33 proceeds to step S405 and determines whether or not the remote communication part 41 has received the unmanned signal SG22 indicating that the occupant is absent.

When the remote-operation start operation is not performed or when the remote communication part 41 does not receive the unmanned signal SG22, the remote CPU 33 ends the remote operation control process as it is.

On the other hand, when the remote-operation start operation is performed and the remote communication part 41 receives the unmanned signal SG22, the remote CPU 33 shifts the control mode from the manned mode to the remote mode in step S406.

In the following step S407, the remote CPU 33 switches the image displayed on the touch screen 31 from the standby image G11 to the operation image G12. Then, in step S408, the remote CPU 33 transmits a remote mode notification signal SG4 for notifying that the control mode is the remote mode using the remote communication part 41, and ends the remote operation control process.

Next, the vehicle control process of the present embodiment will be described with reference to FIG. 14.

Figure 14:
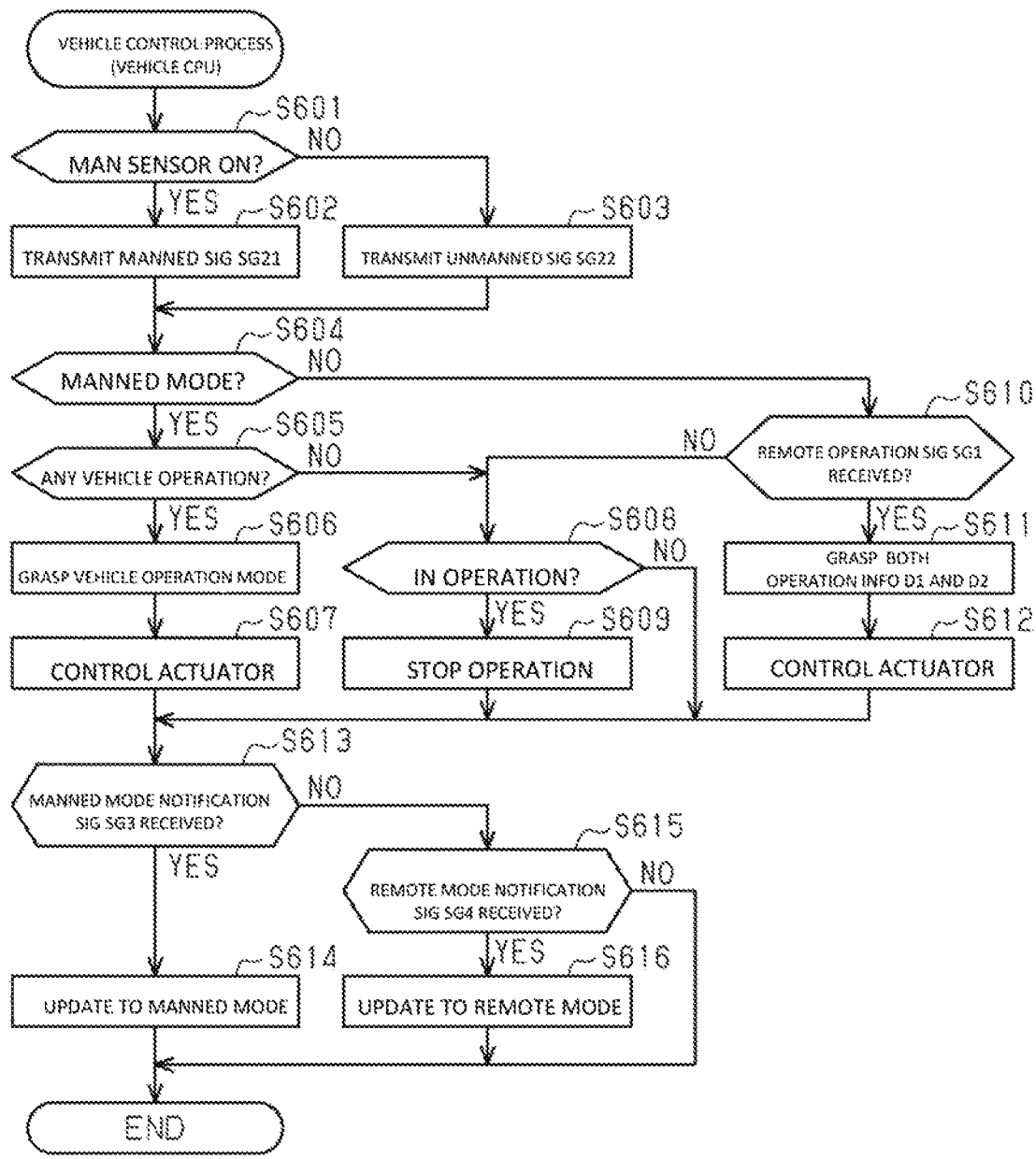
FIG. 14 is a flowchart of a vehicle control process in the second embodiment.

As shown in FIG. 14, the vehicle CPU 27 determines in step S601 whether or not the man sensor 25 is in the ON state. When the man sensor 25 is in the ON slate, the vehicle CPU 27 determines that an occupant is detected, transmits the manned signal SG21 using the vehicle communication part 42 in step S602, and proceeds to step S604. On the other hand, when the man sensor 25 is in the OFF state, the vehicle CPU 27 determines that an occupant as absent, transmits the unmanned signal SG22 using the vehicle communication part 42 in step S603, and proceeds to step S604.

In step S604, vehicle CPU 27 determines whether or not the current control mode is the manned mode. In the present embodiment, the vehicle CPU 27 is configured to grasp the current control mode. Specifically, the vehicle memory 28 is provided with a storage area in which mode information for specifying the current control mode is stored, and the vehicle CPU 27 grasps the current control mode based on the mode information stored in the storage area.

That is, in the present embodiment, both the forklift truck 20 and the remote operation device 30 are provided with a storage area in which the mode information for specifying the control mode as stored, and the vehicle CPU 27 and the remote CPU 33 are respectively able to grasp the current control mode.

When the current control mode is the manned mode, the vehicle CPU 27 executes the processes of steps S605 to S609, and proceeds to step S613. The processes of steps S605 to S609 are similar to the processes of steps S303 to S307 of the first embodiment.

On the other hand, when the current control mode is not the manned mode, that is, the remote mode, the vehicle CPU 27 executes the processes of steps S610 and S608, S609 or steps S611, S612, and proceeds to step S613. The processes of steps S610 to S612 are similar to the processes of steps S309 to S311 of the first embodiment.

In step S613, the vehicle CPU 27 determines whether or not the vehicle communication part 42 receives the manned mode notification signal SG3. When the vehicle communication part 42 receives the manned mode notification signal SG3, the vehicle CPU 27 updates the current control mode to the manned mode in step S614, and ends the vehicle control process. Specifically the vehicle CPU 27 updates the mode information with information corresponding to the manned mode.

When the vehicle communication part 42 does not receive the manned mode notification signal SG3, the vehicle CPU 27 determines in step S615 whether or not the vehicle communication part 42 receives the remote mode notification signal SG4.

The vehicle CPU 27 ends the vehicle control process as it is when the remote mode notification signal SG4 is not received, and updates the current control mode to the remote mode in step S616 when the remote mode notification signal SG4 is received, and ends the vehicle control process. Specifically, the vehicle CPU 27 updates the mode information with information corresponding to the remote mode.

The present embodiment described in detail above has the following effects.

(2-1) The industrial vehicle remote operation system 10 has a remote mode and a manned mode as control modes of the forklift truck 20. In such a configuration, the remote CPU 33 of the remote operation device 30 performs the operation stop control based on a fact that the remote-operation stop operation has been performed on the remote operation device 30 in a situation where the operation of the forklift truck 20 is performed in the remote mode, and shifts the control mode from the remote mode to the manned mode ater the operation stop control is completed.

According to this configuration, the control mode shifts from the remote mode to the manned mode after the operation stop control is completed. The remote operation by the remote operation device 30 is thereby stopped, so that the effects of (1-1) and the like are obtained. Furthermore, the forklift truck 20 may be operated by vehicle operation in the manned mode. Thus, the switch from the remote operation by the remote operation device 30 to the direct operation of the forklift truck 20 by the vehicle operation may be smoothly performed.

(2-2) In the manned mode, the remote CPU 33 shifts the control mode from the manned mode to the remote mode based on a fact that the remote-operation start operation has been performed on the remote operation device 30 and the occupant has not been detected by the man sensor 25.

With such a configuration, it is possible to prevent the remote operation device 30 from performing a remote operation in the presence of an occupant and performing an operation not intended by the occupant. Furthermore, even if the occupant is absent, if the remote-operation start operation is not performed, the mode does not shift to the remote mode, and thus unintended remote operation may be suppressed from being performed.

Third Embodiment

The present embodiment is different from the first embodiment in that the vehicle CPU 27 of the forklift truck 20 performs the operation stop control and the like instead of the remote CPU 33, and accordingly, part of the remote mode process and part of the vehicle control process involved therewith are different from the first embodiment. The different points will be described with reference to FIGS. 15 and 16.

First, the remote mode process of the present embodiment will be described.

Figure 15:
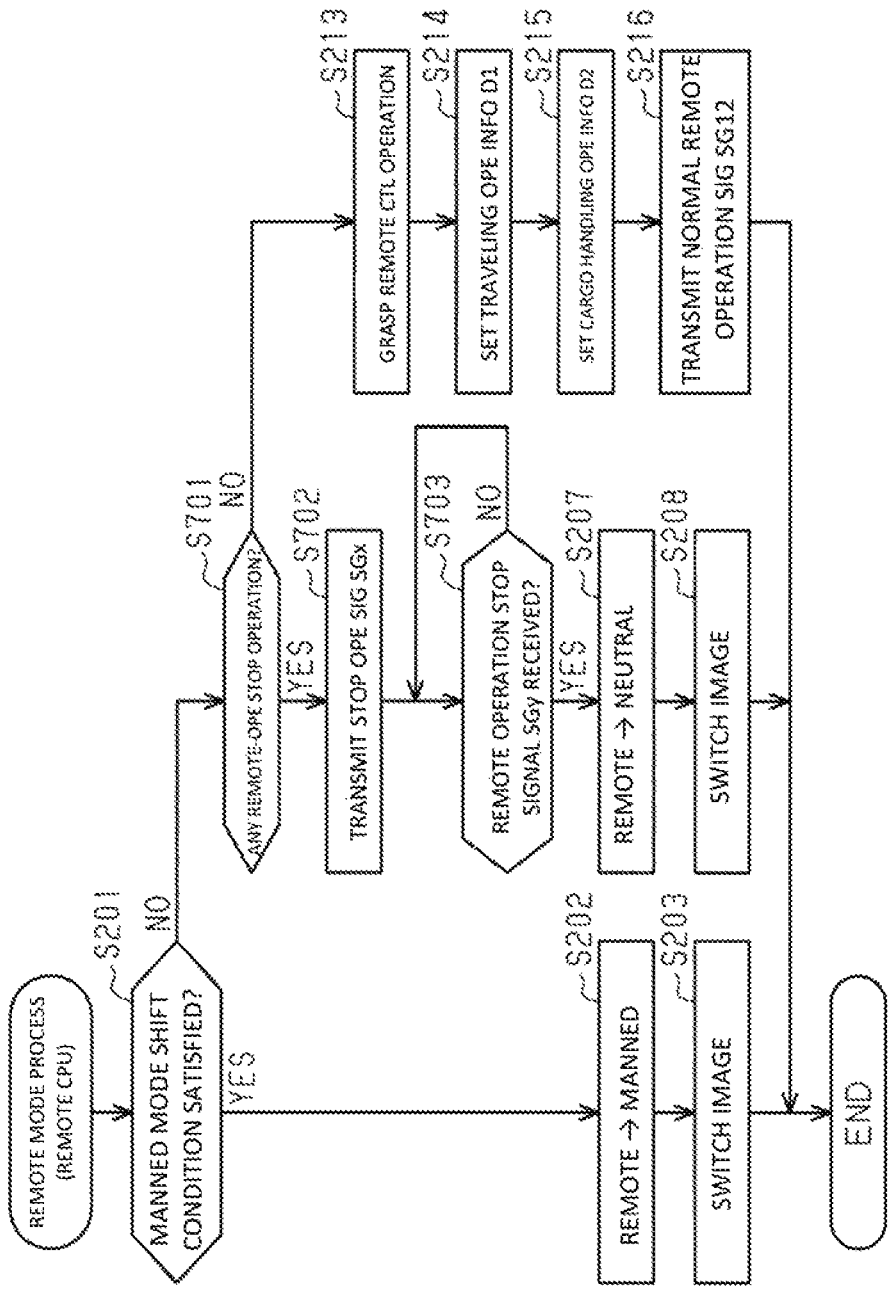
FIG. 15 is a time chart of a remote mode process in a third embodiment.

As shown in FIG. 15, in the remote mode process of the present embodiment, when a negative determination is made in step S201, the remote CPU 33 determines in step S701 whether or not a remote-operation stop operation is being performed.

When the remote-operation stop operation is not being performed, the remote CPU 33 executes the processes of steps S213 to S216, and ends the remote mode process.

On the other hand, when the remote-operation stop operation is being performed, the remote CPU 33 transmits a stop operation signal SGx toward the vehicle communication part 42 using the remote communication part 41 in step S702.

Thereafter, in step S703, the remote CPU 33 waits until the remote communication part 41 receives a remote operation stop signal SGy, and based on the reception of the remote operation stop signal SGy, executes the processes of steps S207 and S208, and ends the remote mode process.

Next, the vehicle control process of the present embodiment will be described with reference to FIG. 16.

Figure 16:
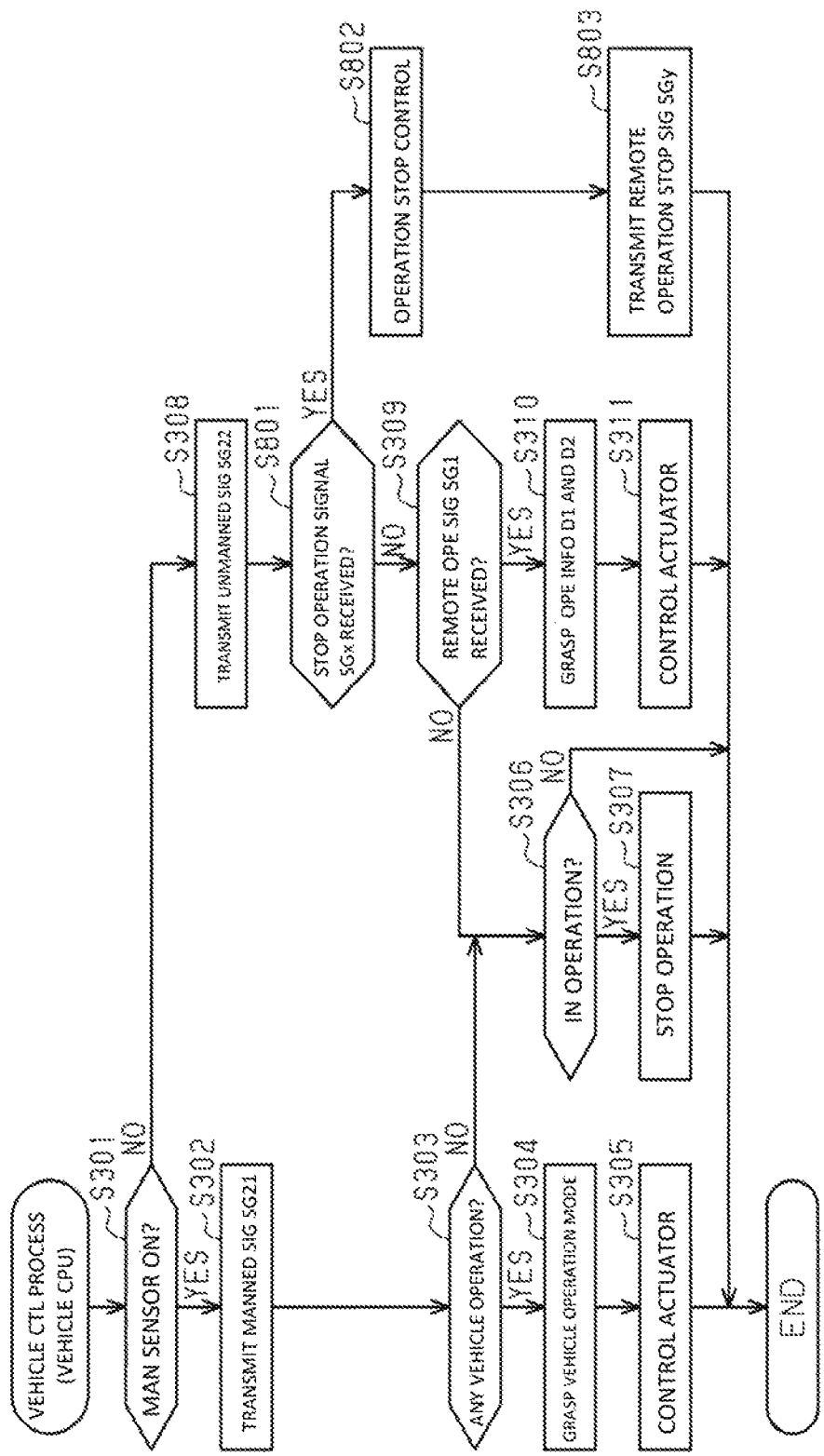
FIG. 16 is a flowchart of vehicle control process in the third embodiment.

As shown in FIG. 16, in the vehicle control process of the present embodiment, the vehicle CPU 27 determines whether or not the vehicle communication part 42 receives the stop operation signal SGx in step S801 after executing the process of step S308.

When the stop operation signal SGx is not received, the vehicle CPU 27 proceeds to step S309.

On the other hand, when the stop operation signal SGx is received, the vehicle CPU 27 proceeds to step S802 and performs the operation stop control. Specifically, the vehicle CPU 27 determines whether or not operation of the forklift truck 20 is performed, and when the operation is performed, controls the actuators 26a and 26b to stop the operation. The process of step S802 is continuously executed until the operation of the forklift truck 20 is stopped.

Based on the completion of the stopping of the operation of the forklift truck 20, the vehicle CPU 27 transmits the remote operation stop signal SGy using the vehicle communication part 42 in step S803, and ends the vehicle control process.

The operation of the present embodiment will be described.

The stop operation signal SGx is transmitted based on the remote-operation stop operation being performed in the remote mode. When the slop operation signal SGx is received during the operation of the forklift truck 20, the operation stop control for stopping the operation of the forklift truck 20 is performed in the vehicle CPU 27, and after the stopping of the operation is completed, the remote operation stop signal SGy is transmitted from the vehicle communication part 42 toward the remote communication part 41. As a result, the control mode shifts from the remote mode to the neutral mode, and the remote operation by the remote operation device 30 is stopped.

In view of the fact that the stop operation signal SGx is a signal transmitted in the remote mode, a situation where the vehicle communication part 42 receives the stop operation signal SGx during the operation of the forklift truck 20 may be said as a situation where the remote operation stop operation is performed in a situation in which the operation of the forklift truck 20 has been performed through the remote operation by the remote operation device 30.

Furthermore, considering the fact that the control mode is shifted based on the remote operation stop signal SGy transmitted from the vehicle CPU 27 and the remote operation by the remote operation device 30 is stopped, it may be said that the vehicle CPU 27 is stopping the remote operation.

In the present embodiment, the process of step S802 corresponds to the "operation stop control" and the "operation stop control step", and the vehicle CPU 27 that executes the processes of steps S802 and S803 corresponds to the "remote-operation stop control part".

The present embodiment described in detail above has the following effects.

(3-1) The vehicle CPU 27 of the forklift truck 20 that includes the vehicle communication part 42 that performs wireless communication with the remote communication part 41 provided in the remote operation device 30 and is remotely operated by the remote operation device 30 performs the operation stop control based on the remote-operation stop operation has been performed in a situation where the forklift truck 20 is operated through the remote operation by the remote operation device 30. Then, the remote CPU 33 slops the remote operation by the remote operation device 30 after the operation stop control is completed. With this configuration, the effects of (1-1) and the lice may be obtained.

The embodiments described above may be modified as follows.

The specific operation content of the remote-operation stop operation is arbitrary, and may be, for example, the second rotation operation, simultaneously performing the input operation of a plurality of locations on the touch screen 31, or operating the stop button when a dedicated stop button is provided.

The vehicle operation is not limited to the operation of the steering wheel 23 or the operation lever 24, and is arbitrary. For example, the vehicle operation may be a pedal operation, or may be an input operation on the touch screen when the forklift truck is provided with the touch screen.

Figure 17:
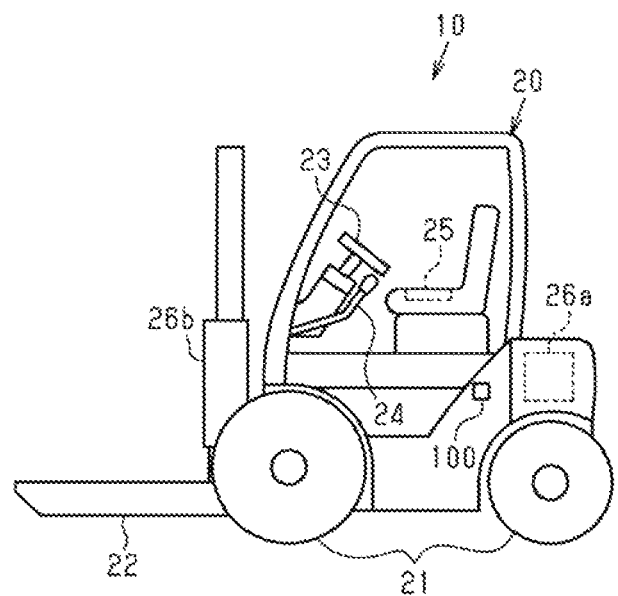
FIG. 17 is a schematic view of a forklift truck for explaining a shift condition of another example.

As shown in FIG. 17, the forklift truck 20 may be provided with a mode change switch 100 that manually switches between "manned" corresponding to the manned mode and "remote" corresponding to the remote mode. In such a configuration, each shift condition may include the state of the mode change switch 100.

Figure 18:
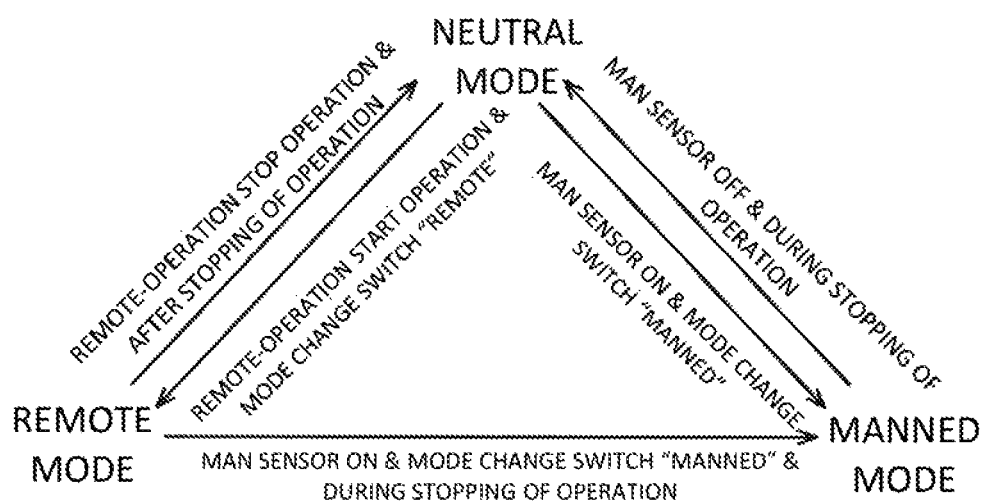
FIG. 18 is a correlation diagram for explaining a shift condition of another example.

For example, as shown in FIG. 18, the remote mode shift condition under a situation where the mode is the neutral mode may be, for example, that a remote-operation start operation is performed and that the mode change switch 100 is set to "remote". That is, the remote CPU 33 may shift the control mode from the neutral mode to the remote mode based on the remote operation start operation performed under a situation where the mode change switch 100 is set to"remote".

For example, the manned mode shift condition under a situation where the mode is the neutral mode may be that an occupant is present on the forklift truck 20 and that the mode change switch 100 is set to "manned". That is, the remote CPU 33 may shift the control mode from the neutral mode to the manned mode based on the mode change switch 100 being "manned" and the man sensor 25 being in the ON stale.

For example, the manned mode shift condition under a situation where the mode is the remote mode may be that the operation of the forklift truck 20 is stopped, that an occupant is present on the forklift truck 20, and that the mode change switch 100 is set to "manned". That is, while the operation of the forklift truck 20 is stopped, the remote CPU 33 may shift the control mode from the remote mode to the manned mode based on that the mode change switch 100 is set to "manned" and the man sensor 25 is in the ON state.

That is, the manned mode shift condition in the neutral mode or the remote mode is not limited only to the fact that the occupant has been detected by the man sensor 25. Furthermore, the manned mode shift condition in the neutral mode may be different from the manned mode shift condition in the remote mode.

When the shift condition of each mode includes the state of the mode change switch 100, the operation of the mode change switch 100 may be urged on the operator to shift the control mode, and thus the mode may be suppressed from becoming the control mode not intended by the operator.

Note that when the shift condition includes the stale of the mode change switch 100 as described above, the vehicle information of the vehicle signal regularly transmitted by the vehicle CPU 27 may include information regarding the state of the mode change switch 100. As a result, the remote CPU 33 may grasp the current state of the mode change switch 100 and may shift the control mode in consideration of the state of the mode change switch 100.

The manned mode shift condition in the neutral mode may not include the fact that the occupant has been detected by the man sensor 25. For example, when the forklift truck 20 is provided with the mode change switch 100 as described above, the manned mode shift condition in the neutral mode may be only that the mode change switch 100 is set to "manned".

The neutral mode shift condition in the manned mode is arbitrary, and may be, for example, only that the occupant has not been detected by the man sensor 25. In this case, the manned mode may shift to the neutral mode during the operation of the forklift truck 20. Even with such a configuration, the vehicle CPU 27 performs the control to stop the operation (step S306 and step S307) when there is no vehicle operation or when the vehicle communication part 42 does not receive the remote operation signal SG1, and hence the operation may be avoided from being continuously performed.

In each of the embodiments, when the manned mode shift condition is satisfied during the operation stop control, the control mode shill from the remote mode to the manned mode, but this is not the sole case, and it may be restricted so that the control mode is not shilled during the operation stop control. The forklift truck 20 thus may be safely stopped.

In the first and third embodiments, the remote CPU 33 is configured prioritize the shift to the manned mode when both the manned mode shift condition and the remote mode shift condition are satisfied in the neutral mode, but this is not the sole case, and may be configured to prioritize the shift to the remote mode. Furthermore, the remote CPU 33 may be configured to maintain the neutral mode without performing the mode shift when both the manned mode shift condition and the remote mode shift condition are satisfied in the neutral mode.

In the first and third embodiments, the remote CPU 33 may prohibit the direct shift from the remote mode to the manned mode. The safety thus may be further enhanced. However, when desiring to perform the manned maneuver early, direct shift from the remote mode to the manned mode is preferably provided.

In the first and third embodiments, the remote CPU 33 may perform a direct shift from the manned mode to the remote mode when a predefined remote mode shift condition is satisfied in the manned mode. In this case, the remote mode shift condition in the manned mode and the remote mode shift condition in the neutral mode may be the same or may be different.

For example, when the forklift truck 20 is provided with a remote mode setting switch, the remote mode shift condition in the manned mode may be that the remote mode setting switch is operated.

In the second embodiment, the vehicle CPU 27 includes a prohibiting part that prohibits the execution of the control of the actuators 26a and 26b based on the vehicle operation when the man sensor 25 is in the OFF slate even in the manned mode. Specifically, the vehicle CPU 27 may determine in step S605 whether or not the man sensor 25 is in the ON state and the vehicle operation is performed.

The standby image G11 or the operation image G12 may be omitted, and the same image may be displayed on the touch screen 31 regardless of the control mode.

Furthermore, the image to be displayed may be different between the neutral mode and the manned mode.

The touch screen 31 is not essential. For example, the touch screen 31 may be omitted, or a display serving as a display screen incapable of input operation may be adopted instead of the touch screen 31 capable of input operation.

As long as the remote CPU 33 may generate the normal remote operation signal SG12 based on the remote control operation on the remote operation device 30, the specific control mode is not limited to that of each embodiment and is arbitrary.

For example, the remote CPU 33 may set the operation information D1 and D2 based not on the slide direction and the slide amount of the slide operation, but on the coordinates of the position where the input operation is currently performed on the touch screen 31.

Furthermore, for example, when the remote operation device 30 is provided with a dedicated button in place of the touch screen 31, the operation of the dedicated button may be adopted in place of or in addition to the input operation on the touch screen 31, as the remote control operation on the remote operation device 30.

Furthermore, the specific configurations of the traveling operation information D1 and the cargo handling operation information D2 are arbitrary, and for example, either one of the traveling speed information Dv and the acceleration information Dα may be omitted.

One of the remote operation stop operation and the remote control operation may be an input operation on the touch screen 31, and the other operation may be an operation other than the input operation on the touch screen 31. For example, when the remote control operation is only an input operation on the touch screen 31, the remote-operation stop operation may be the first rotation operation or the second rotation operation. Thus, an erroneous operation caused by confusing the remote control operation with the remote-operation stop operation may be further suppressed.

When the remote-operation stop operation and the remote control operation have been simultaneously performed on the remote operation device 30, the remote CPU 33 may preferentially execute the process corresponding to the remote control operation over the process corresponding to the remote-operation stop operation (specifically, operation stop control and sopping of remote operation).

The manned signal SG21 or the unmanned signal SG22 is different from the vehicle signal in which the vehicle information is set, but this is not the sole case. For example, the vehicle information may include information for specifying the presence or absence of an occupant The industrial vehicle is not limited to the forklift truck 20 and is arbitrary, and may be any vehicle that has an operation target other than the fork 22.

A storage medium in which the remote operation program 50 is stored may be adopted.

Each embodiment and each different example may be combined appropriately.

REFERENCE SIGNS LIST

10 industrial vehicle remote operation system
20 forklift truck
22 fork
23 steering wheel (vehicle operation part)
24 operation lever (vehicle operation part)
25 man sensor 27 vehicle CPU
30 remote operation device
31 touch screen
33 remote CPU
41 remote communication part
42 vehicle communication part
50 remote operation program
G11 standby image
G12 operation image
SG1 remote operation signal,
SG11 stop remote operation signal
SG12 normal remote operation signal
A1 operation area
Ic1 remote-operation start icon
Ic5 remote-operation stop icon

The invention claimed is:

1. An industrial vehicle remote operation system comprising:
   an industrial vehicle comprising:
      a vehicle processor,
      a vehicle communication interface that performs wireless communication,
      a man sensor that detects an occupant in the industrial vehicle, and
      a vehicle operation part for performing operation of the industrial vehicle,
      wherein the vehicle operation part includes at least a steering wheel and an operation lever; and
   a remote operation terminal, configured to be operated by a user, comprising:
      a remote processor, and
      a remote communication interface that performs wireless communication with the vehicle communication interface, the remote operation terminal being configured to remotely operate the industrial vehicle,
      wherein
   the remote processor is programmed to, based upon a remote-operation stop operation being performed on the remote operation terminal in a situation where operation of the industrial vehicle is being performed through a remote operation by the remote operation terminal, perform an operation stop control for stopping the operation of the industrial vehicle, and stop the remote operation by the remote operation terminal after the operation stop control is completed,
   wherein
   a control mode of the industrial vehicle includes:
      a remote mode in which the operation of the industrial vehicle is performed not through operation of the vehicle operation part but through the remote operation by the remote operation terminal performed by the user,
      a manned mode in which the operation of the industrial vehicle is performed not through the remote operation by the remote operation terminal but through the operation of the vehicle operation part, and
      a neutral mode in which the operation of the industrial vehicle is not performed through any of the remote operation by the remote operation terminal and the operation of the vehicle operation part, and
   the remote processor is programmed to:
      based upon the remote-operation stop operation being performed on the remote operation terminal in a situation where the control mode is the remote mode and the operation of the industrial vehicle is being performed, perform the operation stop control and shift the control mode from the remote mode to the neutral mode after the operation stop control is completed,
      when the control mode is the neutral mode, shift the control mode from the neutral mode to the manned mode based on satisfaction of a manned mode shift condition including that an occupant has been detected by the man sensor, and
      when the control mode is the manned mode, shift the control mode from the manned mode to the neutral mode based on satisfaction of a neutral mode shift condition including that an occupant has not been detected by the man sensor.

2. The industrial vehicle remote operation system according to claim 1, wherein the remote processor is further programmed to, when the control mode is the neutral mode, shift the control mode from the neutral mode to the remote mode based upon a remote-operation start operation being performed on the remote operation terminal.

3. The industrial vehicle remote operation system according to claim 1, wherein
   the remote processor is further programmed to, based upon the remote-operation stop operation being performed on the remote operation terminal in a situation where the control mode is the remote mode and the operation of the industrial vehicle is being performed, perform the operation stop control, and shifts the control mode from the remote mode to the manned mode after the operation stop control is completed.

4. The industrial vehicle remote operation system according to claim 3, wherein
   the remote processor is further programmed to, when the control mode is the manned mode, shifts the control mode from the manned mode to the remote mode based on satisfaction of the remote mode shift condition, and
   the remote mode shift condition includes that an occupant has not been detected by the man sensor and the remote-operation start operation has been performed on the remote operation terminal.

5. The industrial vehicle remote operation system according to claim 1, wherein the remote operation terminal includes,
   a touch screen that displays an operation image when the control mode is the remote mode, and displays a standby image different from the operation image when the control mode is not the remote mode.

6. The industrial vehicle remote operation system according to claim 5, wherein
   the remote-operation stop operation is an input operation to a remote-operation stop icon displayed in the operation image.

7. The industrial vehicle remote operation system according to claim 6, wherein
   the remote control operation includes an input operation on an operation area displayed in the operation image, and
   the remote-operation stop icon and the operation area are arranged spaced apart from each other and disposed respectively on opposite sides of the operation image.

8. The industrial vehicle remote operation system according to claim 1, wherein
   the vehicle processor is further programmed to, when a remote operation signal is received by the vehicle communication interface, drive the industrial vehicle based on the remote operation signal,
   the remote operation terminal remotely operates the industrial vehicle by transmitting the remote operation signal to the vehicle communication interface using the remote communication interface, the remote processor transmits a normal remote operation signal corresponding to the remote control operation on the remote operation terminal as the remote operation signal using the remote communication interface, and the remote processor transmits a stop remote operation signal for stopping the operation of the industrial vehicle using the remote communication interface until the operation of the industrial vehicle is stopped regardless of whether the operation on the remote operation terminal is performed and prohibits the transmission of the normal remote operation signal.

9. An industrial vehicle remote operation system comprising:
an industrial vehicle comprising:
a vehicle processor, and
a vehicle communication interface that performs wireless communication; and
a vehicle operation part for performing the operation of the industrial vehicle,
wherein the vehicle operation part includes at least a steering wheel and an operation lever; and
a remote operation terminal, configured to be operated by a user, comprising:
a remote processor, and
a remote communication interface that performs wireless communication with the vehicle communication interface, the remote operation terminal being configured to remotely operate the industrial vehicle;
wherein
the remote processor is programmed to, based upon a remote-operation stop operation being performed on the remote operation terminal by the user in a situation where operation of the industrial vehicle is being performed through a remote operation by the remote operation terminal, perform an operation stop control for stopping the operation of the industrial vehicle, and stop the remote operation by the remote operation terminal after the operation stop control is completed,
wherein
a control mode of the industrial vehicle includes:
a remote mode in which the operation of the industrial vehicle is performed not through operation of the vehicle operation part but through the remote operation by the remote operation terminal,
a manned mode in which the operation of the industrial vehicle is performed not through the remote operation by the remote operation terminal but through the operation of the vehicle operation part, and
a neutral mode in which the operation of the industrial vehicle is not performed through any of the remote operation by the remote operation terminal and the operation of the vehicle operation part,
the remote processor is programmed to:
based upon the remote-operation stop operation being performed on the remote operation terminal in a situation where the control mode is the remote mode and the operation of the industrial vehicle is being performed, perform the operation stop control and shift the control mode from the remote mode to the neutral mode after the operation stop control is completed,
the remote processor is further programmed to:
based on a fact that the remote control operation, which is a kind of operation on the remote operation terminal and has been performed on the remote operation terminal in a situation where the control mode is the remote mode, perform a control such that the operation of the industrial vehicle corresponding to the remote control operation is performed, and
preferentially perform the remote-operation stop operation over the control by a normal remote control operation when the remote-operation stop operation and the normal remote control operation have been simultaneously performed on the remote operation terminal.

10. A remote operation device configured to be operated by a user, comprising:
a remote communication interface that performs wireless communication with a vehicle communication interface provided in an industrial vehicle; and
a processor programmed to:
based upon a remote-operation stop operation being performed in a situation where operation of the industrial vehicle is being performed through a remote operation by the remote operation device, perform an operation stop control for stopping the operation of the industrial vehicle, and stop the remote operation after the operation stop control is completed,
wherein
a control mode of the industrial vehicle includes:
a remote mode in which the operation of the industrial vehicle is performed not through operation of a steering wheel or an operation lever of the industrial vehicle but through the remote operation by the remote operation device performed by the user,
a manned mode in which the operation of the industrial vehicle is performed not through the remote operation by the remote operation device but through the operation of the steering wheel or the operation lever of the industrial vehicle, and
a neutral mode in which the operation of the industrial vehicle is not performed through any of the remote operation by the remote operation device and the operation of the industrial vehicle through the operation of the steering wheel or the operation lever of the vehicle industrial vehicle, and
the processor is further programmed to:
based upon the remote-operation stop operation being performed on the remote operation device in a situation where the control mode is the remote mode and the operation of the industrial vehicle is being performed, perform the operation stop control and shift the control mode from the remote mode to the neutral mode after the operation stop control is completed,
when the control mode is the neutral mode, shift the control mode from the neutral mode to the manned mode based on satisfaction of a manned mode shift condition including that an occupant has been detected by a man sensor in the industrial vehicle, and
when the control mode is the manned mode, shift the control mode from the manned mode to the neutral mode based on satisfaction of a neutral mode shift condition including that an occupant has not been detected by the man sensor.

11. An industrial vehicle comprising:
a vehicle communication interface that performs wireless communication with a remote communication interface provided in a remote operation terminal,
a man sensor that detects an occupant in the industrial vehicle; and a processor programmed to:
based upon a remote-operation stop operation being performed on the remote operation terminal in a situation where operation of the industrial vehicle is being performed through a remote operation by the remote operation terminal, perform an operation stop control for stopping the operation of the industrial vehicle, and stop the remote operation by the remote operation terminal after the operation stop control is completed, wherein
a control mode of the industrial vehicle includes:
    a remote mode in which the operation of the industrial vehicle is performed not through operation of a steering wheel or an operation lever of the industrial vehicle but through the remote operation by the remote operation terminal performed by a user,
    a manned mode in which the operation of the industrial vehicle is performed not through the remote operation by the remote operation terminal but through the operation of the steering wheel or the operation lever of the industrial vehicle, and
    a neutral mode in which the operation of the industrial vehicle is not performed through any of the remote operation by the remote operation terminal and the operation of the vehicle operation part, and
the processor is further programmed to:
    based upon the remote-operation stop operation being performed on the remote operation terminal in a situation where the control mode is the remote mode and the operation of the industrial vehicle is being performed, perform the operation stop control and shift the control mode from the remote mode to the neutral mode after the operation stop control is completed,
    when the control mode is the neutral mode, shift the control mode from the neutral mode to the manned mode based on satisfaction of a manned mode shift condition including that an occupant has been detected by the man sensor in the industrial vehicle, and
    when the control mode is the manned mode, shift the control mode from the manned mode to the neutral mode based on satisfaction of a neutral mode shift condition including that an occupant has not been detected by the man sensor.

12. A non-transitory remote memory storing an industrial vehicle remote operation program for remotely operating an industrial vehicle using a remote operation terminal that comprises a processor and a remote communication interface that performs wireless communication with a vehicle communication interface provided in the industrial vehicle, the industrial vehicle remote operation program causing the processor to:
based upon a remote-operation stop operation being performed on the remote operation terminal in a situation where operation of the industrial vehicle is being performed through a remote operation by the remote operation terminal, performs an operation stop control for stopping the operation of the industrial vehicle, and stops the remote operation by the remote operation terminal after the operation stop control is completed, wherein
a control mode of the industrial vehicle includes:
    a remote mode in which the operation of the industrial vehicle is performed not through operation of a steering wheel or an operation lever, but through the remote operation by the remote operation terminal performed by a user,
    a manned mode in which the operation of the industrial vehicle is performed not through the remote operation by the remote operation terminal but through the operation of the steering wheel or the operation lever, and
    a neutral mode in which the operation of the industrial vehicle is not performed through any of the remote operation by the remote operation terminal and the operation of the steering wheel or the operation lever, and
the processor is programmed to:
    based upon the remote-operation stop operation being performed on the remote operation terminal in a situation where the control mode is the remote mode and the operation of the industrial vehicle is being performed, perform the operation stop control and shift the control mode from the remote mode to the neutral mode after the operation stop control is completed,
    when the control mode is the neutral mode, shift the control mode from the neutral mode to the manned mode based on satisfaction of a manned mode shift condition including that an occupant has been detected by the man sensor, and
    when the control mode is the manned mode, shift the control mode from the manned mode to the neutral mode based on satisfaction of a neutral mode shift condition including that an occupant has not been detected by the man sensor.

13. An industrial vehicle remote operation method for remotely operating an industrial vehicle using a remote operation terminal that comprises a processor and a remote communication interface that performs wireless communication with a vehicle communication interface provided in the industrial vehicle, the industrial vehicle remote operation method comprising:
an operation stop control step in which the remote operation terminal performs, based on a remote-operation stop operation being performed on the remote operation terminal in a situation where operation of the industrial vehicle is being performed through a remote operation by the remote operation terminal, an operation stop control for stopping the operation of the industrial vehicle, and
a remote operation stop step in which the remote operation terminal stops the remote operation by the remote operation terminal after the operation stop control is completed,
wherein
a control mode of the industrial vehicle includes:
    a remote mode in which the operation of the industrial vehicle is performed not through operation of a steering wheel or an operation lever, but through the remote operation by the remote operation terminal performed by a user,
    a manned mode in which the operation of the industrial vehicle is performed not through the remote operation by the remote operation terminal but through the operation of the steering wheel or the operation lever, and
    a neutral mode in which the operation of the industrial vehicle is not performed through any of the remote operation by the remote operation terminal and the operation of the steering wheel or the operation lever, and the method further comprises:
  based upon the remote-operation stop operation being performed on the remote operation terminal in a situation where the control mode is the remote mode and the operation of the industrial vehicle is being performed, performing the operation stop control and shifting the control mode from the remote mode to the neutral mode after the operation stop control is completed,
  when the control mode is the neutral mode, shifting the control mode from the neutral mode to the manned mode based on satisfaction of a manned mode shift condition including that an occupant has been detected by a man sensor of the industrial vehicle, and
when the control mode is the manned mode, shifting the control mode from the manned mode to the neutral mode based on satisfaction of a neutral mode shift condition including that an occupant has not been detected by the man sensor of the industrial vehicle.

* * * * *